US008833714B2

(12) United States Patent
Haddock et al.

(10) Patent No.: US 8,833,714 B2
(45) Date of Patent: Sep. 16, 2014

(54) TRAPEZOIDAL RIB MOUNTING BRACKET

(76) Inventors: Robert M. M. Haddock, Colorado Springs, CO (US); Dustin Marshall Marston Haddock, Colorado Springs, CO (US)

(*) Notice: Subject to any disclaimer, the term of this patent is extended or adjusted under 35 U.S.C. 154(b) by 48 days.

(21) Appl. No.: 13/403,463

(22) Filed: Feb. 23, 2012

(65) Prior Publication Data
US 2012/0267490 A1 Oct. 25, 2012

Related U.S. Application Data

(60) Provisional application No. 61/446,787, filed on Feb. 25, 2011.

(51) Int. Cl.
*A47G 29/02* (2006.01)
*E04G 3/20* (2006.01)
*E06B 7/28* (2006.01)

(52) U.S. Cl.
USPC ............. 248/237; 248/500; 248/505; 52/395; 52/710

(58) Field of Classification Search
USPC ............ 248/237, 500, 505, 507; 52/710, 395, 52/466, 463, 469
See application file for complete search history.

(56) References Cited

U.S. PATENT DOCUMENTS 2,714,037 A * 7/1955 Singer et al. .................. 239/201
4,475,776 A * 10/1984 Teramachi ...................... 384/45
5,743,063 A * 4/1998 Boozer ........................... 52/713
2008/0236520 A1 10/2008 Maehara et al.
2009/0320826 A1 12/2009 Kufner
2011/0271611 A1* 11/2011 Maracci et al. .............. 52/173.3

FOREIGN PATENT DOCUMENTS

| AU | 2009101276 | 1/2010 |
| EP | 1804008 | 7/2007 |
| EP | 2105971 | 9/2009 |
| JP | 2003-155803 | 5/2003 |

OTHER PUBLICATIONS

Kee Walk—Roof Top Walkway [online], [retrieved on Mar. 1, 2012], Retrieved from http://simplifiedsafety.com/solutions/keewalk-roof-top-walkway/.
Miller Fusion Roof Anchor Post [online], [retrieved on Mar. 1, 2012], Retrieved from http://www.millerfallprotection.com/fall-protection-products/roofing-products/miller-fusion-roof-anchor-post.

(Continued)

*Primary Examiner* — Amy J Sterling
(74) *Attorney, Agent, or Firm* — James L. Johnson; Marsh Fischmann & Breyfogle LLP

(57) ABSTRACT

A mounting bracket (220) for a trapezoidal rib (204) is disclosed. The mounting bracket (220) includes an upper wall (224) in the form of a flat surface for supporting various types of attachments. An attachment may be secured relative to the mounting bracket (220) using a mounting hole (226) on the bracket upper wall (224). The bracket upper wall (224) is disposed above the trapezoidal rib (204) by a pair of rib offsetting members (246*a/b*) that are disposed within a hollow interior (248) of the mounting bracket (220), and that are seated on the upper wall (206) of the trapezoidal rib (204). A threaded fastener (114), engaged with the mounting hole (226) on the bracket upper wall (224) to secure an attachment relative to the mounting bracket (220), terminates within the hollow interior (248) of the mounting bracket (220).

28 Claims, 22 Drawing Sheets

(56) References Cited

OTHER PUBLICATIONS

KeeLine the Safety Solution for Horizontal Life Lines [online], [retrieved on Mar. 1, 2012], Retrieved from http://keesafety.co.uk/products/kee_line, Reading, United Kingdom.

New "Alzone 360 system" [online], [retrieved Mar. 1, 2012], Retrieved from http://www.arrid.com.au/?act=racking_parts, Australia.

Rees-Snow Retention Systems [online], [retrieved Mar. 1, 2012], Retrieved from http://www.rees-oberstdorf.de/en/products/snow-retention-system.html.

EJOT Solar Fastening System for Trapezoidal and Corrugated Metal Profile Roofs/Sandwich Panels [online], [retrieved Mar. 1, 2012], Retrieved from http://www.ejot.com/ejot/de/EJOT_Solarbefestiger_fuer_Trapez-_und_WellprofilSandwichelemente--4608,websiteLang_en.htm.

Schüco mounting system MSE 210—On-roof [online], [retrieved Mar. 1, 2012], Retrieved from http://www.schueco.com/web/de-en/partner/solarstrom_und_waerme/products/photovoltaik/kristalline_pv-module/montagesystem_mse_210/8319272.

Schletter Solar-Mounting Systems Component Overview 2011[online], [retrieved Mar. 6, 2012], Retrieved from http://www.schletter.de/152-1-Solar-mounting-systems.html.

IDEEMATEC Tracking & Mounting Systems [online], Apr. 2008, [retrieved Mar. 6, 2012], Retrieved from http://www.ideematec.de. safeTec solar brackets brochure, IDEEMATEC, Germany.

\* cited by examiner

TRAPEZOIDAL RIB MOUNTING BRACKET

CROSS-REFERENCE TO RELATED APPLICATIONS

This patent application claims priority to co-pending U.S. Provisional Patent Application Ser. No. 61/446,787, that is entitled "TRAPEZOIDAL RIB MOUNTING BRACKET," that was filed on Feb. 25, 2011, and the entire disclosure of which is hereby incorporated by reference in its entirety herein.

FIELD OF THE INVENTION

The present invention generally relates to installing structures on a building surface and, more particularly, to a mounting bracket for use with trapezoidal rib panels.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole in a base 154 of a clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping member 142 includes a pair of clamping legs 146, where each clamping leg 146 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

SUMMARY

A first aspect of the present invention is directed to a mounting bracket for trapezoidal rib panels. This mounting bracket includes an upper wall having at least one mounting hole, first and second side legs, and at least one rib offsetting member. The mounting hole extends completely through the upper wall, and accommodates securing an attachment relative to the mounting bracket. The first and second side legs each extend downwardly from the upper wall when the mounting bracket is positioned on a trapezoidal rib, and these side legs are disposed in non-parallel relation to one another. The first side leg is disposable adjacent to a first side of a trapezoidal rib when the mounting bracket is positioned on a trapezoidal rib. Similarly, the second side leg is disposable adjacent to a second side of a trapezoidal rib when the mounting bracket is positioned on a trapezoidal rib. At least one hollow space exists between the first and second side legs of the mounting bracket. One or more rib offsetting members are disposed within this hollow space. Each rib offsetting member extends from at least one of the first and second side legs, is spaced from the upper wall, and is engageable with an upper rib wall of a trapezoidal rib when the mounting bracket is positioned on a trapezoidal rib. As such, each rib offsetting member utilized by the mounting bracket offsets the upper wall of the bracket from an upper rib wall of a trapezoidal rib when the mounting bracket is positioned on a trapezoidal rib.

A second aspect of the present invention is directed to a mounting bracket for trapezoidal rib panels. This mounting bracket includes an upper wall, first and second side legs, and at least one rib offsetting member. The upper wall defines an uppermost extreme of the mounting bracket when installed on a trapezoidal rib. An entirety of this upper wall is in the form of a single flat surface that incorporates at least one mounting hole, where the perimeter of this upper wall defines an area of at least 2.5 inches$^2$ to provide an appropriate surface for supporting attachments of any appropriate type (discussed below). The mounting hole extends completely through the upper wall, and accommodates securing an attachment relative to the mounting bracket. The first and second side legs each extend downwardly from the upper wall when the mounting bracket is positioned on a trapezoidal rib, and these side legs are disposed in non-parallel relation to one another. The first side leg is disposable adjacent to a first side of a trapezoidal rib when the mounting bracket is positioned on a trapezoidal rib. Similarly, the second side leg is disposable adjacent to a second side of a trapezoidal rib when the mounting bracket is positioned on a trapezoidal rib. Each rib offsetting member utilized by the mounting bracket offsets the upper wall of the bracket from an upper rib wall of a trapezoidal rib when the mounting bracket is positioned on a trapezoidal rib. In this regard, a first open space is disposed directly below the upper wall of the mounting bracket. This first open space has a vertical extent of at least ½ inch, and may be considered as part of at least one hollow space that exists between the first and second side legs of the mounting bracket.

A number of feature refinements and additional features are separately applicable to each of above-noted first and second aspects of the present invention. These feature refinements and additional features may be used individually or in any combination in relation to each of the first and second aspects as well. Any references herein to "above," "below," or the like are in relation to the mounting bracket being in an upright position. References herein to a "vertical" dimension is that which coincides with an upright position or orientation for the mounting bracket. For instance, if the ends of the first and second side legs of the mounting bracket were supported on a horizontal reference surface (to dispose the mounting bracket in an upright position), the "vertical dimension" would the dimension that is orthogonal to this horizontal reference surface. In a roofing application, the pitch of the roof may define the baseline for what is "upright" for purposes of the mounting bracket. That is, the noted vertical dimension may be characterized as being the dimension that is orthogonal to the pitch of the roof in this case (e.g., the upper wall of the mounting bracket may be disposed above an upper rib wall of a trapezoidal rib on which the mounting bracket is positioned, where "above" is measured in the noted vertical dimension (e.g., orthogonal to the pitch of the roof in this case)).

The mounting bracket may be of one-piece construction, where the mounting bracket lacks joint of any kind between adjacent portions of the mounting bracket. In one embodiment, the entire mounting bracket is in the form of an extrusion, and which provides the noted one-piece construction. The mounting bracket may be formed from any appropriate material or combination of materials, such as an appropriate metal alloy.

The mounting bracket may be characterized as having first and second open ends. The upper wall of the mounting bracket may be characterized as extending between these first and second open ends, and where the entirety of this upper wall is in the form of a single flat surface that incorporates at least one mounting hole. In one embodiment, this single flat surface of the bracket upper wall has a perimeter that defines an area of at least 2.5 inches$^2$ to provide an appropriate surface for supporting attachments of any appropriate type (discussed below). The upper wall of the mounting bracket may also be characterized as defining an uppermost extreme of the mounting bracket when positioned on a trapezoidal rib, where the entirety of this upper wall is in the form of a single flat surface that incorporates at least one mounting hole and that has a perimeter that defines an area of at least 2.5 inches$^2$. Any such single flat surface that defines the upper wall of the mounting bracket may be the only external surface of the mounting bracket that faces or projects in a first direction when the mounting bracket is positioned on a trapezoidal rib.

The upper wall of the mounting bracket may include a single mounting hole (e.g., centered between the opposite ends of the mounting bracket). More than one mounting hole could be incorporated by the upper wall. Each such mounting hole in the upper wall may extend completely through the entire wall thickness of the upper wall. Each mounting hole may be of any appropriate configuration (e.g., round; in the form of an elongated slot or a "slotted hole"). Finally, each mounting hole may be one of threaded or unthreaded.

Any appropriate attachment fastener (e.g., a threaded stud having at least one nut threaded thereon; a threaded bolt) may be directed at least into a particular mounting hole on the upper wall of the mounting bracket to secure an attachment relative to the mounting bracket. The mounting bracket may include an open space directly below each mounting hole utilized by the upper wall to allow a free end of a corresponding attachment fastener to extend therein without contacting an internal structure of the mounting bracket (or the upper rib wall of a trapezoidal rib on which the mounting bracket is positioned). A given attachment fastener could be threadably engaged with the upper wall (e.g., by a corresponding mounting hole being threaded). Such a threaded attachment fastener could terminate within the wall thickness, or could extend completely through the entire thickness of the upper wall. A given attachment fastener could extend completely through a corresponding mounting hole without being threadably engaged with the upper wall. For instance, a nut could be threaded onto a portion of such an attachment fastener that extends beyond/below the upper wall.

The first and second side legs may be the mirror image of one another. For instance, the inner or included angle between the upper wall and the first side leg may be at least substantially the same as the inner or included angle between the upper wall and the second side leg. As the mounting bracket is adapted for use with trapezoidal rib panels, each such included angle will be greater than 90° (e.g., 115°-120°).

Typically the first and second side legs will be configured to be disposed at least generally parallel to the corresponding side of a trapezoidal rib on which the mounting bracket is positioned. At least part of each of the side legs of the bracket may contact the corresponding side of a trapezoidal rib on which the mounting bracket is positioned when the mounting bracket is secured to this trapezoidal rib using one or more fasteners (e.g., part of the inner surface of each bracket side leg may be spaced from the corresponding side of a trapezoidal rib). Although the first and second side legs could extend along the entirety of the corresponding side of a trapezoidal rib on which the mounting bracket is positioned (e.g., such that the mounting bracket would enclose the entirety of such a trapezoidal rib), the first and second side legs may only extend along an upper portion of a corresponding side of such a trapezoidal rib (e.g., so as to enclose only an upper portion of such a trapezoidal rib, for instance the upper ⅔ of such a trapezoidal rib).

The inner surfaces of each of the side legs of the mounting bracket may include a gasket pocket or receptacle. An appropriate gasket may be positioned within each of these gasket pockets. Each such gasket pocket may be configured so as to at least substantially confine a gasket positioned therein. In one embodiment, the inner surface of each of the side legs of the mounting bracket includes a pair of rails, projections, or dimples that are spaced from one another and that may extend along at least part of the length of the mounting bracket (e.g., in a dimension coinciding with the spacing between its oppositely disposed open ends, noted above). The noted gasket pockets may be defined by the space between each corresponding pair of projections.

Additional functions may be provided by the above-noted projections on the inner surfaces of the side legs of the mounting bracket. These projections may contact the corresponding side of the trapezoidal rib when the mounting bracket is secured to the trapezoidal rib. As such and for the above-noted embodiment, there may be two discrete zones of contact between each side leg of the mounting bracket and the corresponding side of the trapezoidal rib. This reduces the overall contact between each side leg and a corresponding side of a trapezoidal rib, which should reduce the potential for what is referred to in the art as "capillary entrapment" (e.g., reduces the potential of moisture "wicking" into interfacing surfaces between the mounting bracket and a trapezoidal rib, where such moisture may lead to premature failure of the trapezoidal rib panel surface due to corrosion or the like). Another function provided by these projections is that they should reduce the potential of the above-noted gaskets being over-compressed when the mounting bracket is secured to a trapezoidal rib using one or more fasteners.

One or more fastener holes may extend through each of the side legs of the mounting bracket. These fastener holes may be un-threaded. Although any appropriate number of fastener holes may be associated with each of the side legs, two fastener holes per side leg will be appropriate for at least some applications. These fastener holes may accommodate the use of rivets, sheet metal screws, or the like to secure the mounting bracket to a trapezoidal rib.

There are a number of points of note with regard to securing the above-described mounting bracket to a trapezoidal rib. One is that no fasteners extend through the upper wall of the mounting bracket and through the corresponding trapezoidal rib in order to secure the mounting bracket to this trapezoidal rib. As such, the entirety of the upper wall of the mounting bracket is available as a supporting surface (e.g., to allow an attachment to be installed on a trapezoidal rib panel surface using the noted mounting brackets). Another is that each fastener that secures the mounting bracket to a trapezoidal rib terminates within the hollow interior of the trapezoidal rib. No fastener that secures the mounting bracket to a trapezoidal rib extends to any underlying deck or any other substrate (e.g., purlins) for a trapezoidal rib panel surface that incorporates a plurality of trapezoidal ribs. This provides significant flexibility when installing attachments on trapezoidal rib panel surfaces. Multiple brackets of the type described herein may be used for an attachment assembly to support an attachment(s) above a trapezoidal rib panel surface without having these brackets be directly anchored to an underlying substrate or support deck for the trapezoidal rib panel surface.

The rib offsetting member used by the mounting bracket may be in the form of a cross member that extends between the first and second side legs. This may separate the hollow interior of the mounting bracket into two separate spaces—a first open space between the upper wall of the mounting bracket and this cross member (e.g., to allow an attachment fastener to extend through a mounting hole in the upper wall and to extend into this first open space and without contacting any internal structure of the mounting bracket), as well as a rib receptacle in which at least an upper portion of a trapezoidal rib may be disposed.

The rib offsetting member used by the mounting bracket may be in the form of first and second rib offsetting members. The first rib offsetting member may extend from the first side leg of the mounting bracket toward, but not to, the second side leg. Similarly, the second rib offsetting member may extend from the second side leg of the mounting bracket toward, but not to, the first side leg. That is, the free ends of the first and second rib offsetting members may be spaced from one another within the hollow interior of the mounting bracket. In any case, a first open space may extend above the first and second rib offsetting members to the underside of the upper wall of the mounting bracket (e.g., to allow an attachment fastener to extend through a mounting hole in the upper wall and to extend into this first open space without contacting any internal structure of the mounting bracket), and a rib receptacle may be defined below the first and second rib offsetting members and in which at least an upper portion of a trapezoidal rib may be disposed.

The above-described mounting bracket may be part of an attachment assembly. The mounting bracket may be positioned on a trapezoidal rib such that at least one rib offsetting member of the mounting bracket is positioned (e.g., on an upper rib wall of this trapezoidal rib) to dispose the upper wall of the mounting bracket above and in spaced relation to the upper rib wall of this trapezoidal rib. An attachment fastener may be directed at least into a mounting hole on the upper wall of the mounting bracket to secure an attachment relative to the mounting bracket. Various types of attachments may be utilized, and either may be directly secured to the mounting bracket by at least one attachment fastener and a corresponding mounting hole in the upper wall of the mounting bracket, or may be indirectly secured to the mounting bracket by at least one attachment fastener and a corresponding mounting hole in the upper wall of the mounting bracket.

A third aspect of the present invention is directed to a photovoltaic system that includes a mounting assembly. This mounting assembly in turn includes a mounting bracket, a mounting plate, a clamping member or a pull-down grab member, and a clamp fastener. More specifically, the mounting bracket includes an upper wall and an oppositely disposed bottom, where the upper wall includes at least one mounting hole, where the bottom includes a rib receptacle that is sized to receive at least an upper portion of a trapezoidal rib (e.g., a trapezoidal rib of a trapezoidal rib panel surface), and where this rib receptacle is defined by a pair of inner side surfaces that are disposed in non-parallel and spaced relation to one another (e.g., inner surfaces of the first and second side legs discussed above in relation to the mounting bracket of the first and second aspects). The mounting plate is positioned on the upper wall of the mounting bracket. The clamping member includes first and second clamping legs, where the first clamping leg is available for engaging one photovoltaic module, and where the second clamping leg is available for engaging an adjacent photovoltaic module. The clamp fastener extends through the clamping member, then through the mounting plate, and then at least into a mounting hole on the upper wall of the mounting bracket.

A number of feature refinements and additional features are applicable to the third aspect of the present invention. These feature refinements and additional features may be used individually or in any combination in relation to the third aspect as well. Initially, the mounting bracket discussed above in relation to the first and second aspects may be used as the mounting bracket for this third aspect. The clamp fastener may be threaded into a mounting hole on the upper wall of the mounting bracket. Any appropriate clamp fastener may be utilized to activate a clamping action for the clamping member in relation any photovoltaic module positioned on the mounting plate (e.g., a threaded stud having at least one nut threaded thereon; a bolt). A threaded stud as the threaded clamp fastener may include a nut whose position is fixed on the stud. A nut single nut may be threaded onto such a threaded stud, or a pair of threaded nuts may be threaded onto the stud so as to be disposed on each side of the clamping member, depending upon the circumstances. A clamp fastener could also extend through a corresponding mounting hole on the upper wall (without any threaded engagement between the clamp fastener and the upper wall), and a nut could be threaded onto an end of the clamp fastener that extends beyond/below the upper wall (within the hollow interior of the mounting bracket). For instance, the portion of the clamp fastener that extends through the mounting hole could be un-threaded in this case, the mounting hole could be un-threaded in this case, or both.

As discussed above in relation to the first and second aspects, and which is again applicable to this third aspect, no fastener that secures the mounting bracket to a trapezoidal rib extends to any underlying deck or any other substrate (e.g., purlins) for the case of a trapezoidal rib panel surface that incorporates such a trapezoidal rib. This provides significant flexibility when installing PV modules on trapezoidal rib panel surfaces. Multiple brackets of the type described herein may be used to install a plurality of photovoltaic modules above a trapezoidal rib panel surface without having these mounting brackets be directly anchored to an underlying substrate or support deck for the trapezoidal rib panel surface.

These photovoltaic modules may be installed with or without rails using the mounting brackets described herein. A total of at least four of the mounting brackets described herein may be used to support a given photovoltaic module. Where a photovoltaic module is characterized as having four edge portions (e.g., of a square or rectangular configuration), at least two mounting brackets may support one edge portion of a given photovoltaic module, and at least two mounting brackets may support an oppositely disposed edge portion of the photovoltaic module. This allows the sheeting of the trapezoidal rib panel surface to itself support the photovoltaic modules (versus having to "anchor" supporting structures for the photovoltaic modules to the underlying deck or substrate for the trapezoidal rib panel surface).

The mounting plate may be a structure having first and second oppositely disposed and planar surfaces. However, various features may be incorporated by the mounting plate to facilitate one or more aspects of the installation of a photovoltaic system. For instance, the mounting plate may incorporate one or more features to facilitate the alignment/positioning of one or more photovoltaic modules relative to the mounting assembly for/during installation. The mounting plate may incorporate one or more features to facilitate the grounding of a photovoltaic module that is engaged/secured by the corresponding mounting assembly. The mounting plate may incorporate one or more wire management features. Each of these three overall/general features may be individually incorporated by the mounting plate. Any and all combinations of these three overall/general features may be incorporated by the mounting plate as well.

The mounting plate may be of any appropriate size, shape, and/or configuration (e.g., a circular outer perimeter; a square outer perimeter; a rectangular outer perimeter), may be formed from any appropriate material or combination of materials (e.g., a metal or metal alloy), or both. The mounting plate may include an upper surface and an oppositely disposed lower surface, with the lower surface being in contact with the mounting bracket (e.g., its upper surface) when the mounting assembly is installed on a building surface.

The upper surface of the mounting plate may include first and second PV module positional registrants. These first and second PV module positional registrants may be utilized to dispose first and second PV modules on the upper surface of the mounting plate in a position for proper engagement by the clamping member. In one embodiment, the first PV module is positioned in at least adjacent relation to the first PV module positional registrant and the second PV module is positioned in at least adjacent relation to the second PV module positional registrant. In one embodiment, the first PV module actually butts up against the first PV module positional registrant (e.g., the first PV module positional registrant disposes the first PV module in a certain position on the mounting plate), while the second PV module actually butts up against the second PV module positional registrant (e.g., the second PV module positional registrant disposes the second PV module in a certain position on the mounting plate).

Each of the above-noted first and second PV module positional registrants may be of any appropriate size, shape, configuration, and/or type, and furthermore may be disposed in any appropriate arrangement on the upper surface of the mounting plate. In one embodiment the upper surface of the mounting plate includes what may be characterized as a raised structure (e.g., of a continuous or unitary nature). First and second portions on a perimeter of this raised structure may be characterized as the noted first and second PV module positional registrants.

The clamp fastener may extend through a center of the raised structure on the upper surface of the mounting plate. An outer perimeter of the raised structure may be circular in a plan view. The raised structure may be centrally disposed relative to an outer perimeter of the mounting plate. An outer perimeter of the raised structure and an outer perimeter of the mounting plate may be concentric or concentrically disposed relative to the clamp fastener. The raised structure may be characterized as annular, doughnut-shaped, ring or ring-like, or any combination thereof. In any case, the raised structure may be integrally formed with a remainder of the mounting plate, such that the need to separately attach the raised structure to the mounting plate may be alleviated (e.g., the mounting plate and the raised structure may be a one-piece structure).

The raised structure may be a configuration that alleviates the need to position the mounting plate on the mounting bracket in any particular orientation. Consider the case where a first reference line extends from the clamp fastener and remains in a fixed position relative to the mounting plate, where a second reference line extends from the clamp fastener and moves along with the mounting plate as the mounting plate is rotated relative to the mounting bracket about the clamp fastener, and where the first and second reference lines are contained within a common plane. The raised structure may be of a configuration that allows for any angle between the first and second reference lines (including the case where there is no angle at all or a "zero angle"), and yet still allows the raised structure to be used to positionally register each of first and second photovoltaic modules relative to the mounting plate (e.g., by the first and second PV modules engaging oppositely disposed portions on the perimeter of the raised structure).

The first and second PV module positional registrants may be separate and discrete structures (i.e., not different portions of a common structure, such as the above-noted raised structure). The first and second PV module positional registrants in this case may be disposed along a common reference line that passes through the clamp fastener. Although the first and second PV module positional registrants may be disposed at different distances from the clamp fastener, in one embodiment the first and second PV module positional registrants are disposed the same distance from the clamp fastener.

An installer could visually determine the proper orientation for the mounting plate on the mounting bracket when the first and second PV module positional registrants are separate and discrete structures. However, it may be desirable to include at least one mounting bracket positional registrant on a lower surface of the mounting plate for purposes of establishing a desired positioning of the mounting plate on the mounting bracket (e.g., such that the clamping member should sufficiently engage each of a pair of adjacently disposed photovoltaic modules). Each such mounting bracket positional registrant may be of any appropriate size, shape, configuration, and/or type (e.g., tabs, pins, posts, or the like). In one embodiment, a pair of mounting bracket positional registrants is utilized to engage oppositely disposed portions of the mounting bracket (e.g., a pair of oppositely disposed ends of the mounting bracket to dispose the mounting plate in a desired position relative to the mounting bracket).

The upper surface of the mounting plate may include what may be characterized as a plurality of "grounding projections." Each such grounding projection may be of any appropriate size, shape, configuration, and/or type. The grounding projections may be integrally formed with a remainder of the mounting plate, such that the need to separately attach each grounding projection to the mounting plate is alleviated (e.g., the mounting plate and the plurality of grounding projections may be a one-piece structure).

The various grounding projections may be of a configuration that facilitates establishing an electrical connection with and/or providing a grounding function for a photovoltaic module (e.g., by engaging a frame of such a photovoltaic module, and which may require that the grounding projection(s) pierce or penetrate a surface or surface coating of this frame). For instance, each grounding projection could incorporate one or more edges to desirably interface with a corresponding photovoltaic module. One or more of the grounding projections could be in the form of a tooth or a tooth-like structure. One or more of the grounding projections could be in the form of a hollow cylinder that incorporates at least one edge on a free end thereof.

The grounding projections may be characterized as providing electrical continuity between adjacent photovoltaic modules that are positioned on a common mounting plate (e.g., an electrical path may encompass the frame of one photovoltaic module, one or more grounding projections engaged therewith, an associated mounting plate, one or more additional grounding projections, and the frame of another photovoltaic module engaged by such an additional grounding projection(s)). This may be referred to in the art as "bonding." In any case, the grounding projections may be used in providing a grounding function for a corresponding photovoltaic module(s). The noted electrical connection provided by the grounding projections may be used to electrically connect adjacent photovoltaic modules (e.g., those positioned on a common mounting plate), and which may be used to provide an electrical path to ground a string or collection of photovoltaic modules.

The plurality of grounding projections may be characterized as being spaced about the clamp fastener. The plurality of grounding projections may be equally spaced about the clamp fastener (e.g., located every 90° in the case where there are four grounding projections). In one embodiment, each grounding projection on the upper surface of the mounting plate is located further from the clamp fastener than each of the first and second PV module positional registrants.

Any appropriate number of grounding projections may be utilized on the upper surface of the mounting plate, and multiple grounding projections may be disposed in any appropriate arrangement. One embodiment has at least one grounding projection engaged with each photovoltaic module (e.g., its frame) that is placed on the mounting plate. It should be appreciated that a first grounding projection or a first set of grounding projections could engage a first photovoltaic module placed on the mounting plate, and that a second grounding projection or a second set of grounding projections could engage a second photovoltaic module placed on the mounting plate, where the first and second grounding projections are different ones of the plurality of grounding projections, and where the first and second sets of grounding projections do not include any common grounding projections.

The number and/or arrangement of the plurality of grounding projections may be selected so as to alleviate the need to position the mounting plate on the mounting bracket in any particular orientation, and yet still allow one or more of the grounding projections to be in contact with each photovoltaic module positioned on the mounting plate. Consider the case where a first reference line extends from the clamp fastener and remains in a fixed position relative to the mounting plate, where a second reference line extends from the clamp fastener and moves along with the mounting plate as the mounting plate is rotated relative to the mounting device about the clamp fastener, and where the first and second reference lines are contained within a common plane. The number and/or arrangement of the plurality of grounding projections may be selected such that any angle may exist between the first and second reference lines (including the case where there is no angle at all or a "zero angle"), and yet still allow one or more grounding projections to be in contact with each photovoltaic module positioned on the mounting plate.

The lower surface of the mounting plate may include at least one wiring clip, including where this lower surface includes a plurality of wiring clips. Any appropriate number of wiring clips may be utilized. Multiple wiring clips may be spaced about the clamp fastener, and including in equally-spaced relation (e.g., every 90° in the case where there are four of such wiring clips). In one embodiment, each wiring clip on the lower surface of the mounting plate is located further from the clamp fastener than each of the first and second PV module positional registrants.

The wiring clips may be of any appropriate configuration that allows one or more wires to be retained in the space between the wiring clip and the lower surface of the mounting plate. A portion of each wiring clip may be disposed in at least generally parallel and spaced relation to the lower surface of the mounting plate, and this portion may include a recessed region to facilitate the retention of one or more wires, quick-connect leads, or the like therein.

Multiple wiring clips may be disposed in any appropriate arrangement on the lower surface of the mounting plate. Although each mounting clip could be separately attached to the mounting plate, in one embodiment each mounting clip is integrally formed with the remainder of the mounting plate (e.g., such that the mounting plate and each of its mounting clips is a one-piece structure). Consider the case where the mounting clips are "stamped" from the body of the mounting plate. The resulting aperture in the mounting plate may also be utilized in the installation of photovoltaic modules. For instance, an installer may direct a cable or zip tie through such an aperture to bundle a plurality of wires or the like together that are located underneath the mounting assembly or in the space between an adjacent pair of PV modules.

A number of feature refinements and additional features are separately applicable to each of above-noted aspects of the present invention. These feature refinements and additional features may be used individually or in any combination in relation to each of the above-noted aspects of the present invention. Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a mounting bracket includes "a mounting hole" alone does not mean that the mounting bracket includes only a single mounting hole). Moreover, any failure to use phrases such as "at least one" also does not limit the corresponding feature to the singular (e.g., indicating that a mounting bracket includes "a mounting hole" alone does not mean that the mounting bracket includes only a single mounting hole). Use of the phrase "at least generally" or the like in relation to a particular feature encompasses the corresponding characteristic and insubstantial variations thereof (e.g., indicating that bracket legs are at least generally minor image of each other encompasses the bracket legs being the mirror image of each other). Finally, a reference of a feature in conjunction with the phrase "in one embodiment" does not limit the use of the feature to a single embodiment.

DETAILED DESCRIPTION

Figure 1:
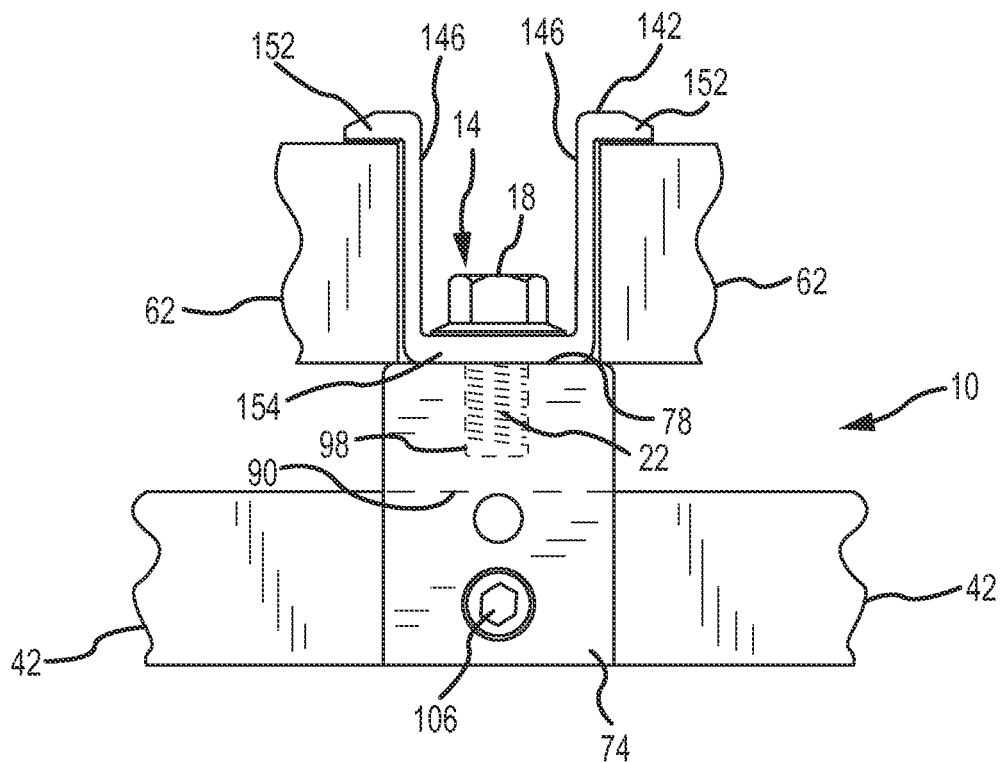
FIG. 1 is a side view of a prior art mounting assembly for interconnecting solar cell modules with a standing seam roof.
Figure 2:
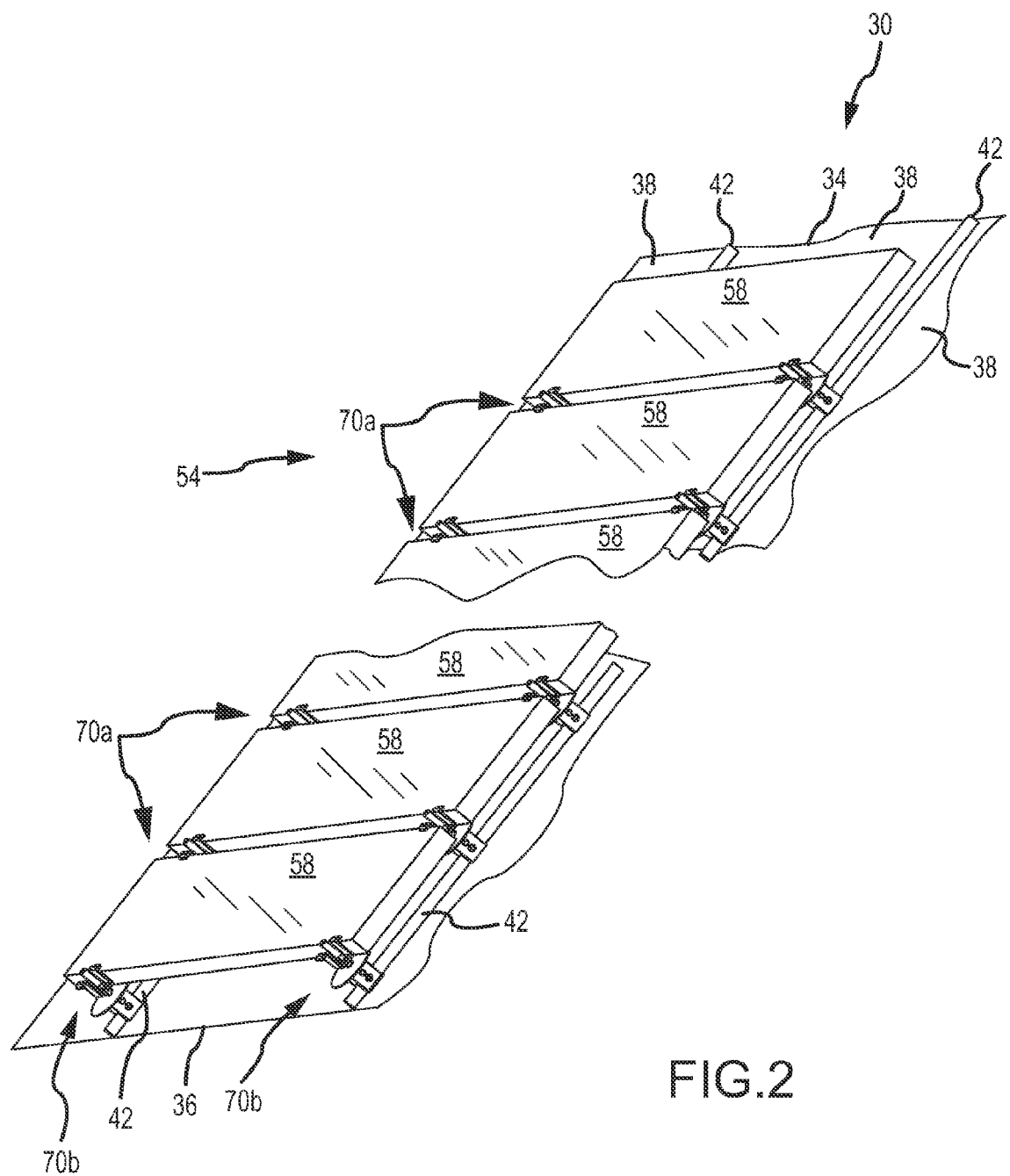
FIG. 2 is a perspective view of a plurality of solar cell modules installed on a standing seam building surface using a plurality of adjustable mounting assemblies.

FIG. 2 illustrates an assembly 30 in the form of a building surface 34, a photovoltaic or solar cell array 54 defined by a plurality of photovoltaic modules or solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

Figure 3:
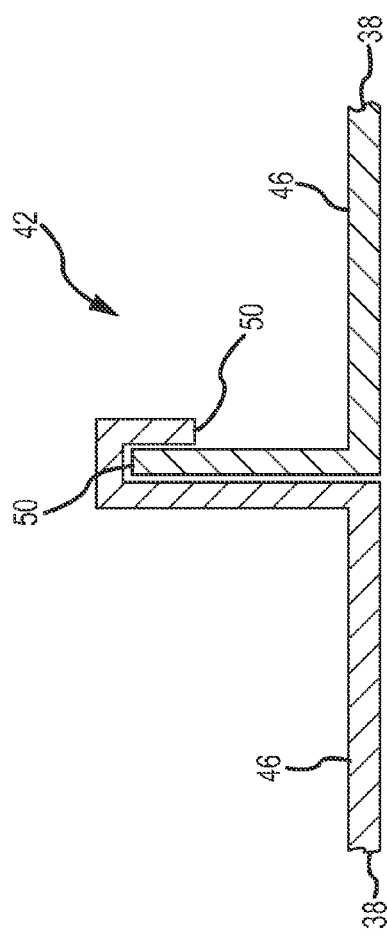
FIG. 3 is a cross-sectional schematic of a representative standing seam defined by interconnecting a pair of panels.

A cross-sectional schematic of one of the standing seams 42 is illustrated in FIG. 3. There it can be seen that a pair of interconnected panels 38 define a standing seam 42. Generally, an edge or edge section 50 of one panel 38 is "nested" with the opposing edge or edge section 50 of the adjacent panel 38 to define a standing seam 42. Typically each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, and which may provide different configurations/profiles for the corresponding standing seam 42.

Figure 4:
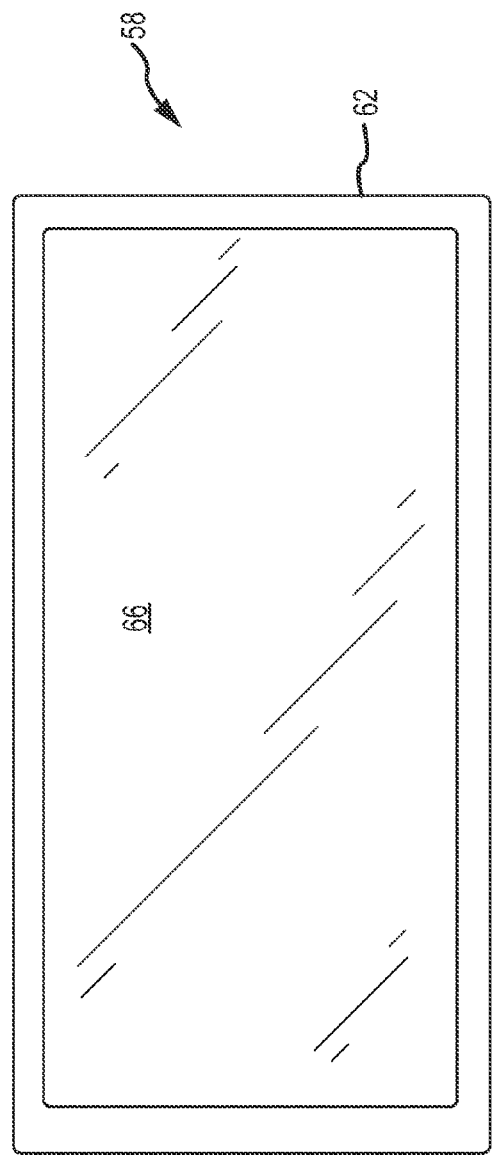
FIG. 4 is a top view of one of the solar cell modules illustrated in FIG. 2.

A more detailed view of one of the photovoltaic modules or solar cell modules 58 from FIG. 2 is presented in FIG. 4. Each solar cell module 58 includes a frame 62 that is disposed about the corresponding solar cell 66. The frame 62 may be of any appropriate size, shape, configuration, and/or type, and may be formed from any appropriate material or combination of materials. In the illustrated embodiment, the frame 62 is of a rectangular profile, and may be formed from an appropriate metal or metal alloy (e.g., aluminum). Similarly, the photovoltaic cell or solar cell 66 may be of any appropriate size, shape, configuration and/or type to convert light into electricity. Typically the solar cell 66 will be in the form of a substrate having a stack of a plurality of layers. Any number of solar cell modules 58 may be used for the solar cell array 54 of FIG. 2, and multiple solar cell modules 58 may be disposed in any appropriate arrangement.

Figure 5:
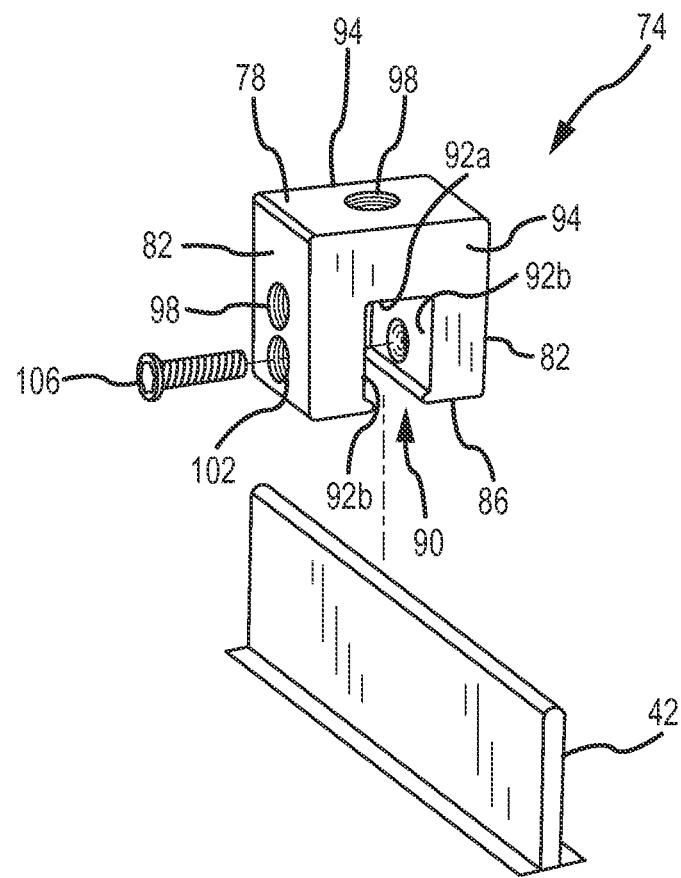
FIG. 5 is a perspective view of one of the mounting devices that is installed on a standing steam in FIG. 2.

The mounting assemblies 70a, 70b that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92a and a pair of sidewalls 92b that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92b. A cavity of any appropriate type may be on this opposing slot sidewall 92b to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and that may be used in place of the mounting device 74 shown in FIG. 5. Various mounting device configurations are disclosed in U.S. Pat. Nos. 5,228,248; 5,483,772; 5,941,931; 5,694,721; 5,715,640; 5,983,588; 6,164,033; 6,718,718; 7,100,338; and 7,013,612, and which may be utilized by either of the mounting assemblies 70a, 70b.

Figure 6:
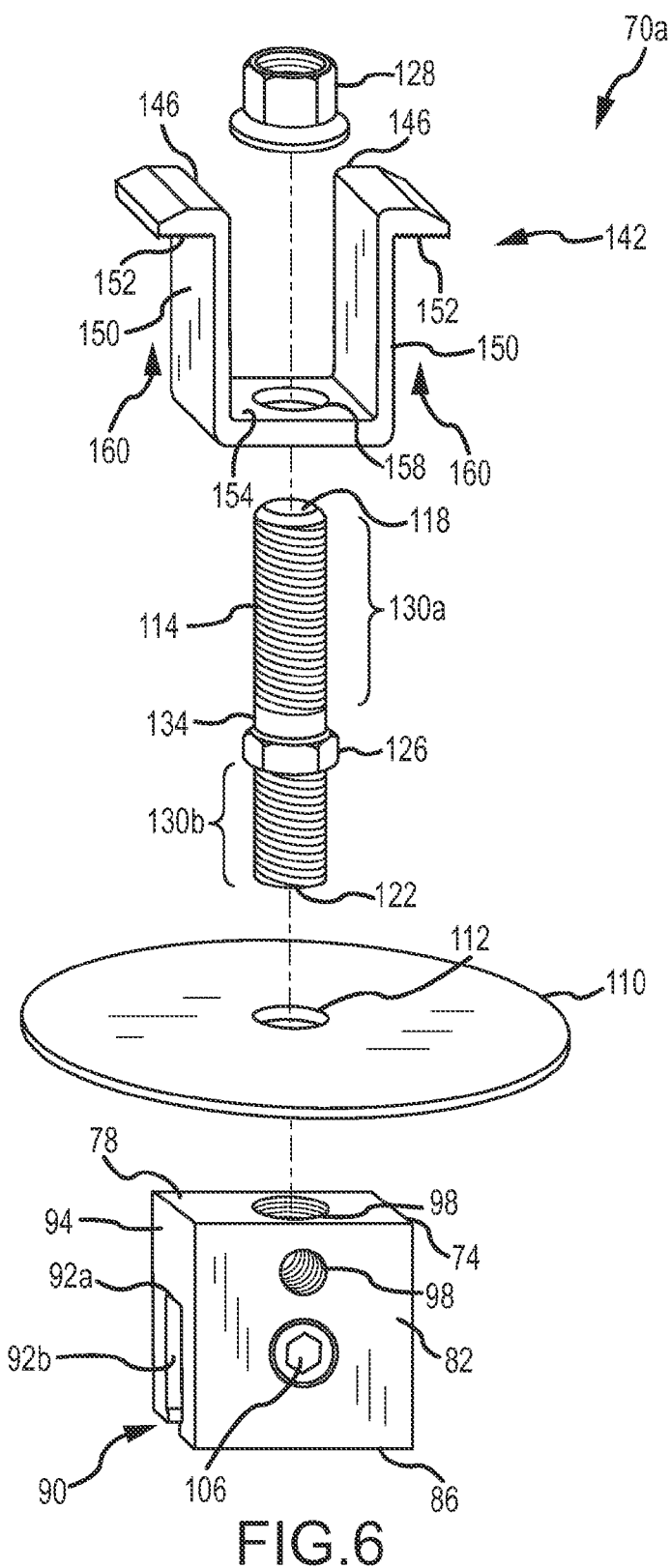
FIG. 6 is an exploded, perspective view of one of the adjustable mounting assemblies from FIG. 2.

The mounting assembly 70a that is used in the installation of a pair of adjacent solar cell modules 58 in FIG. 2, and that may use a mounting device 74, is illustrated in FIG. 6. The mounting assembly 70a includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70a, and in any case may be of any appropriate size, shape, configuration and/or type. The surface area of the mounting plate 110 is at least about 5 in$^2$ in one embodiment, and is at least about 7 in$^2$ in another embodiment. It may be possible to eliminate the mounting plate 110 from the mounting assembly 70a, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130a extends from the first stud end 118 toward the second stud end 122, while a second threaded section 130b extends from the second stud end 122 toward the first stud end 118. An unthreaded section 134 is disposed between the fixed nut 126 and the first threaded section 130a in the illustrated embodiment. However, the first threaded section 130a could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70a is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70a. In the illustrated embodiment, the engagement sections 150 include teeth, serrations, or like to enhance the "grip" on the structure being clamped to the mounting assembly 70a. The clamping legs 146 may be of any appropriate size, shape, and/or configuration for clamping a structure to the mounting assembly 70a. Generally, a pocket 160 is defined between each engagement section 152 and the underlying mounting plate 110/mounting device 74 for receiving a structure to be clamped to the mounting assembly 70a.

Figure 7A:
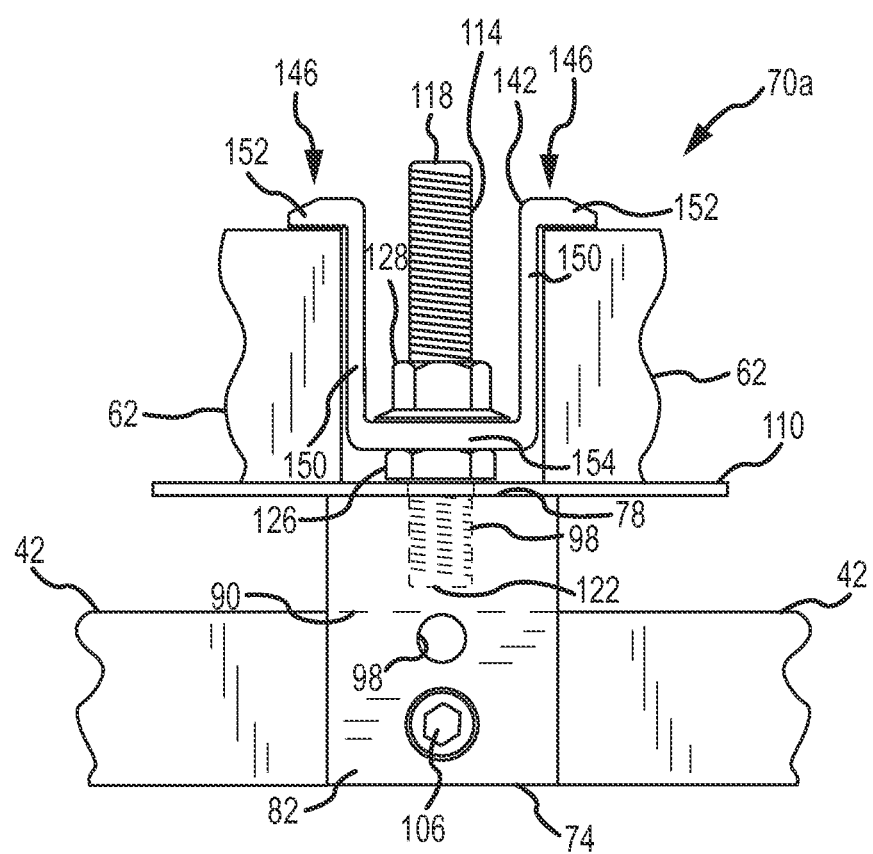
FIG. 7A is a side view of one of the adjustable mounting assemblies from FIG. 2, and which is engaging a pair of solar cell module frames.

FIG. 7A illustrates one of the mounting assemblies 70a from FIG. 2, and which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be positioned on the stud 114 at the time when the solar cell module frames 62 are disposed on the mounting plate 110, although this may require that the clamping member 142 be lifted to a degree at this time to accommodate positioning the frames 62 under the engagement sections 152 of the clamping member 142.

Figure 7B:
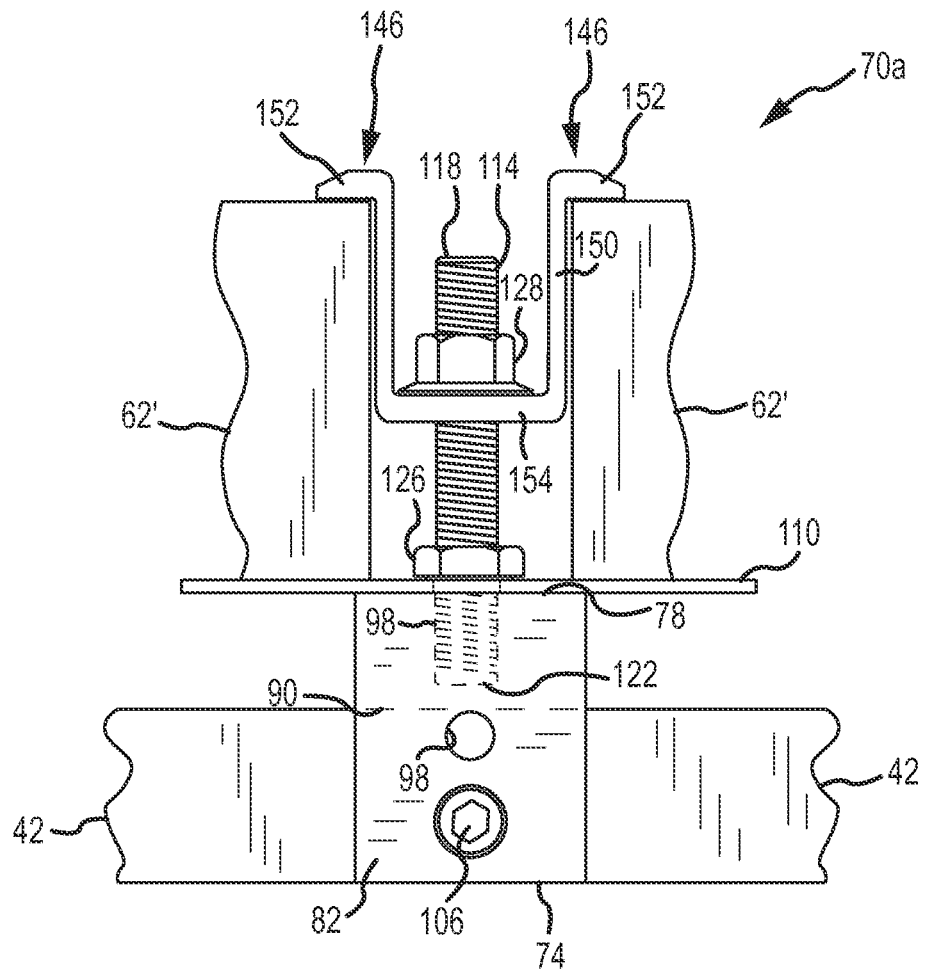
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates using the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
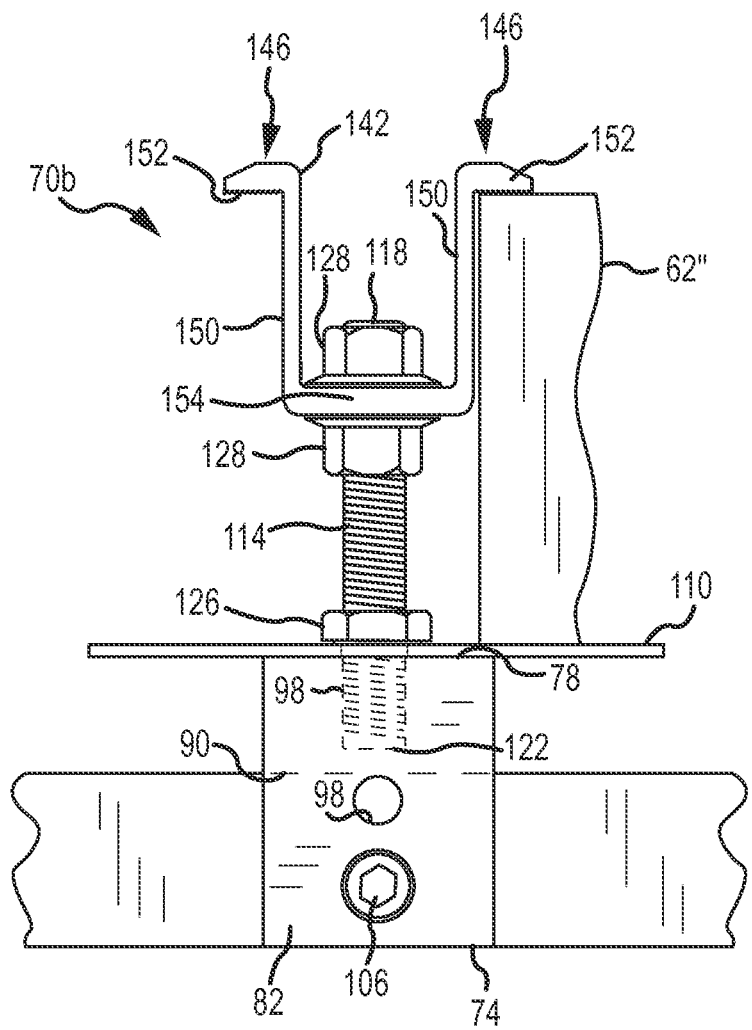
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70b and the mounting assembly 70a is that an additional nut 128 is used by the mounting assembly 70b. Therefore, the remainder of the discussion presented above also applies to the mounting assembly 70b.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

Another embodiment of a mounting assembly, which may be used for mounting photovoltaic or solar cell modules to a building surface having a plurality of standing seams defined by a plurality of interconnected panels, is illustrated in FIGS. 8A-F and is identified by reference numeral 70c. Corresponding components between the mounting assembly 70c and the above-discussed mounting assembly 70a are identified by the same reference numerals. Those corresponding components between these two embodiments that differ in at least some respect are identified by the same reference numeral, but with a "single prime" designation in relation to the mounting assembly 70c.

The mounting assembly 70c of FIGS. 8A-F utilizes the above-discussed mounting device 74, clamping member 142, and stud 114. All of the features discussed above in relation to each of these components remain equally applicable to the mounting assembly 70c. The mounting assembly 70c does utilize a mounting plate 110' that is positioned on an upper surface 78 of the mounting device 74, and that is located between the clamping member 142 and the mounting device 74 in a dimension corresponding with the length dimension of the stud 114. However, the mounting place 110' is of a different configuration than the mounting plate 110 utilized by the mounting assembly 70a, and therefore the noted "single prime" designation is utilized.

The mounting plate 110' includes an upper surface 170 and an oppositely disposed lower surface 176. The upper surface 170 includes a plurality of grounding projections 172. The grounding projections 172 may be integrally formed with a remainder of the mounting plate 110' (e.g., the mounting plate 110' and grounding projections 172 may be of one-piece construction, such that the individual grounding projections 172 do not need to be separately attached to the mounting plate 110'). Any appropriate number of grounding projections 172 may be utilized. Each grounding projection 172 may be of any appropriate size, shape, and/or configuration. The various grounding projections 172 may be equally spaced from the stud 114, may be equally spaced about the stud 114, or both.

In one embodiment, the number of grounding projections 172 is selected and the grounding projections 172 are arranged such that at least one grounding projection 172 will engage each photovoltaic module being mounted to a building surface by the clamp assembly 70c, regardless of the angular position of the mounting plate 110' relative to the stud 114. "Angular position" does not mean that the mounting plate 110' is disposed at an angle relative to the upper surface 78 of the mounting device 74. Instead, "angular position" means a position of the mounting plate 110' that may be realized by rotating the mounting plate 110' relative to the stud 114 and/or the mounting device 74. Consider the case where the ends 94 of the mounting device 74 define the 12 o'clock and 6 o'clock positions. The mounting plate 110' may be positioned on the mounting device 74 with each of its grounding projections 172 being disposed at any angle relative to the 12 o'clock position (e.g., in the 1 o'clock position, in the 2 o'clock position, in the 8 o'clock position, etc), and yet at least one grounding projection 172 will engage each photovoltaic module being mounted to a building surface by the clamp assembly 70c. The "angle" of each such grounding projection 172 is the angle between first and second reference lines that are disposed within a common plane, the first reference line remaining in a fixed position relative to the mounting plate 110' and extending from the stud 114, for instance, to the noted 12 o'clock position. The second reference line may also extend from the stud 114 to a particular grounding projection 172, and thereby may rotate along with the mounting plate 110' as its angular position is adjusted relative to the stud 114 and/or mounting device 74.

The grounding projections 172 may facilitate establishing an electrical connection with and/or assisting in grounding one or more photovoltaic modules. The grounding projections 172 may be characterized as providing electrical continuity between adjacent photovoltaic modules that are positioned on the same mounting plate 110' (e.g., an electrical path may encompass the frame of one photovoltaic module, one or more grounding projections 172 engaged therewith, the mounting plate 110', one or more additional grounding projections 172, and the frame of another photovoltaic module engaged by such an additional grounding projection(s) 172). This may be referred to in the art as "bonding." In any case, the grounding projections 172 may be used in providing a grounding function for a corresponding photovoltaic module(s). The noted electrical connection provided by the grounding projections 172 may be used to electrically connect adjacent photovoltaic modules (e.g., those positioned on a common mounting plate 110'), and which may be used to provide an electrical path to ground a string or collection of photovoltaic modules.

The mounting device 110' also includes a raised structure 174 on its upper surface 170. The raised structure 174 may be disposed about the un-threaded hole 112 in the mounting plate 110' and through which the stud 114 passes. Generally and as will be discussed in more detail below, the raised structure 174 may be used to determine where a photovoltaic module should be positioned on the upper surface 170 of the mounting plate 110' to ensure that the clamping member 142 will adequately engage not only this photovoltaic module, but an adjacently disposed photovoltaic module as well. As such, the raised structure 174 may be characterized as a positional registrant or alignment feature for each an adjacent pair of photovoltaic modules being clamped by a common mounting assembly 70c.

The raised structure 174 may be integrally formed with a remainder of the mounting plate 110' (e.g., the mounting plate 110' and raised structure 174 may be of one-piece construction, such that the raised structure 174 does not need to be separately attached to the mounting plate 110'). The raised structure 174 may be characterized as being doughnut-shaped. The raised structure 174 may extend completely about the stud 114, the stud 114 may extend through a center of the raised structure 174, or both. The raised structure 174 may be circular in a plan view. This alleviates the requirement to have the mounting plate 110' be in a certain angular position on the upper surface 78 of the mounting device 74 to provide its positional registration or alignment function in relation to the photovoltaic modules to be clamped. An outer perimeter of the raised structure 174 and an outer perimeter of the mounting plate 110' may be concentrically disposed relative to the stud 114. The raised structure 174 may be centrally disposed relative to an outer perimeter of the mounting plate 110'.

The lower surface 176 of the mounting plate 110' includes a plurality of wiring tabs or clips 178. The wiring clips 178 may be integrally formed with a remainder of the mounting plate 110' (e.g., the mounting plate 110' and wiring clips 178 may be of one-piece construction, such that the individual wiring clips 178 do not need to be separately attached to the mounting plate 110'). For instance, the wiring clips 178 could be "stamped" from the body of the mounting plate 110'. In this regard, the mounting plate 110' includes an aperture 184 for each such wiring clip 178. Any appropriate number of wiring clips 178 may be utilized. The various wiring clips 178 may be equally spaced from the stud 114, may be equally spaced about the stud 114, or both.

In one embodiment, the number of wiring clips 178 is selected and the wiring clips 178 are arranged such that at least one wiring clip 178 should be available for holding/retaining one or more wires from/for each photovoltaic module being mounted to a building surface by the clamp assembly 70c, regardless of the angular position of the mounting plate 110' relative to the stud 114 and/or mounting device 74.

Each wiring clip 178 may be of any appropriate size, shape, and/or configuration. In the illustrated embodiment, each wiring clip 178 includes a first segment 180a that extends away from the lower surface 176 of the mounting plate 110', along with a second segment 180b that extends from a distal end of the first segment 180a. The second segment 180b may be disposed at least generally parallel with the lower surface 176 of the mounting plate 110'. In any case, the second segment 180b may include a recessed region 182 (e.g., a concave area) to facilitate retention of one or more wires and/or quick-connect leads.

A wiring clip 178 may be used the support and/or retain the quick-connect lead(s) associated with one of the photovoltaic modules being clamped by the corresponding mounting assembly 70c (e.g., by being positioned within the space between the second segment 180b of a given wiring clip 178 and the lower surface 176 of the mounting plate 110', for instance by resting in a concave portion of the second segment 180b in the form of the noted recessed region 182). Other wires could be directed into the space between the second segment 180b of a given wiring clip 178 and the lower surface 176 of the mounting plate 110'.

Another function is indirectly provided by the wiring clips 178. The aperture 184 associated with each wiring clip 178 provides a space through which an installer may direct cable or zip tie or the like to bundle together various wires that may be located at a lower elevation than the mounting plate 110' (e.g., wires underneath the mounting assembly 70c; wires underneath a photovoltaic module being clamped by the mounting assembly 70c; wires in a space between a pair of photovoltaic modules being clamped by the mounting assembly 70c).

Figure 8A:
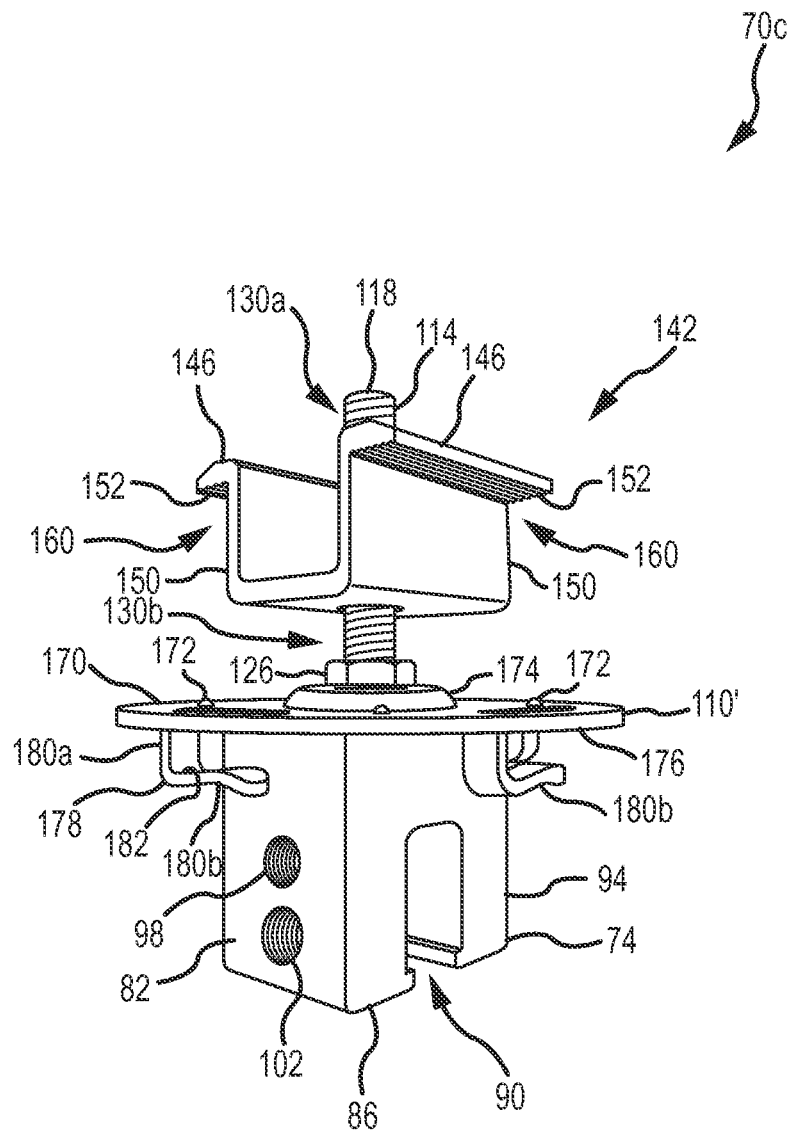
FIG. 8A is one side-based perspective view of another embodiment of a mounting assembly for photovoltaic modules.
Figure 8B:
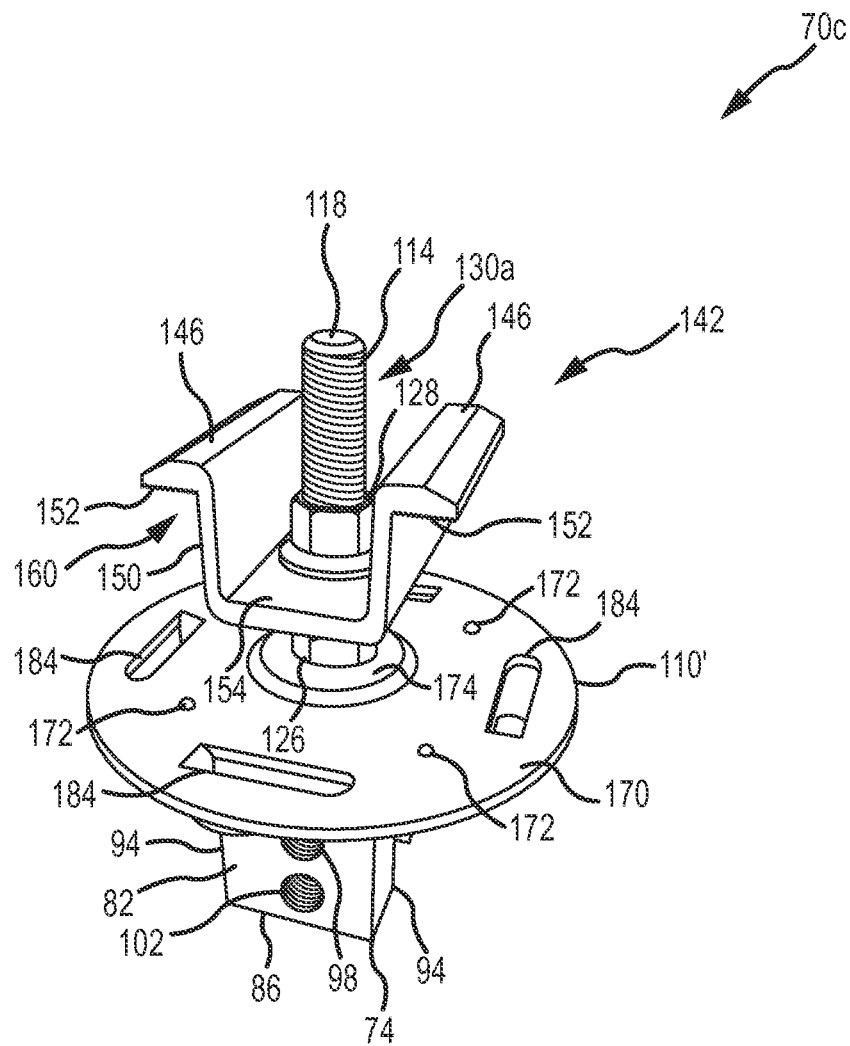
FIG. 8B is one top-based perspective view of the mounting assembly of FIG. 8A.
Figure 8C:
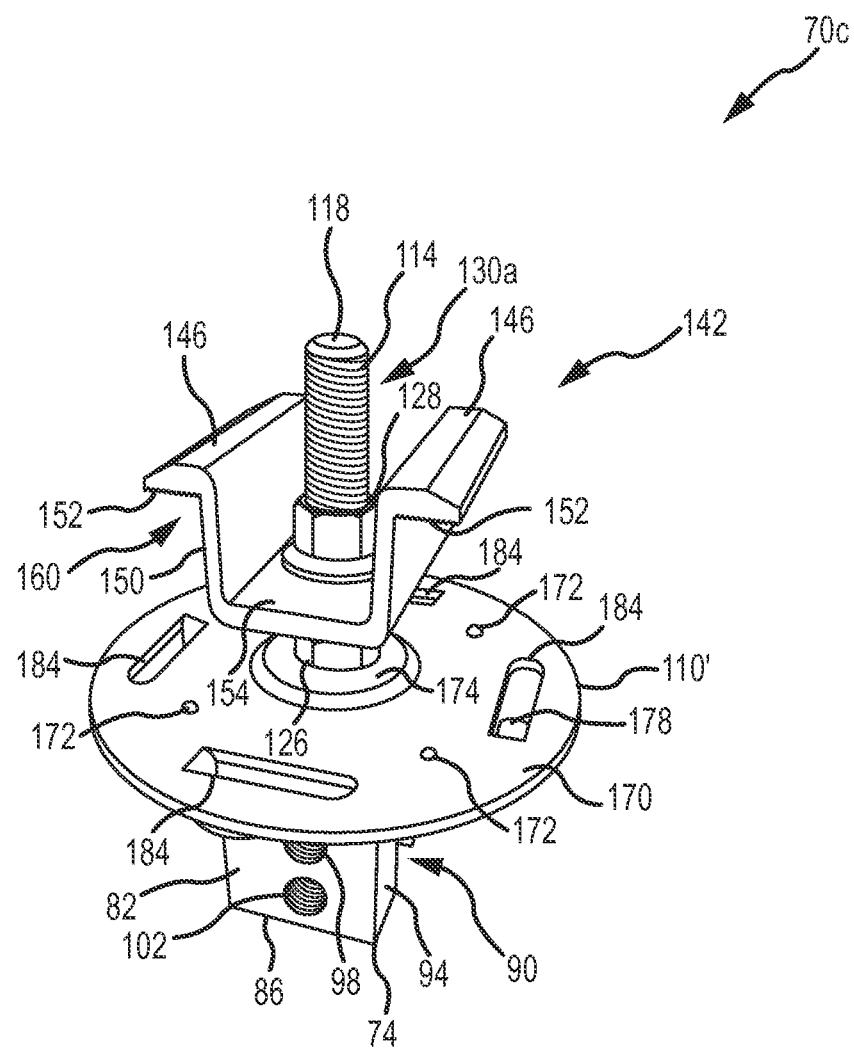
FIG. 8C is another one top-based perspective view of the mounting assembly of FIG. 8A.
Figure 8D:
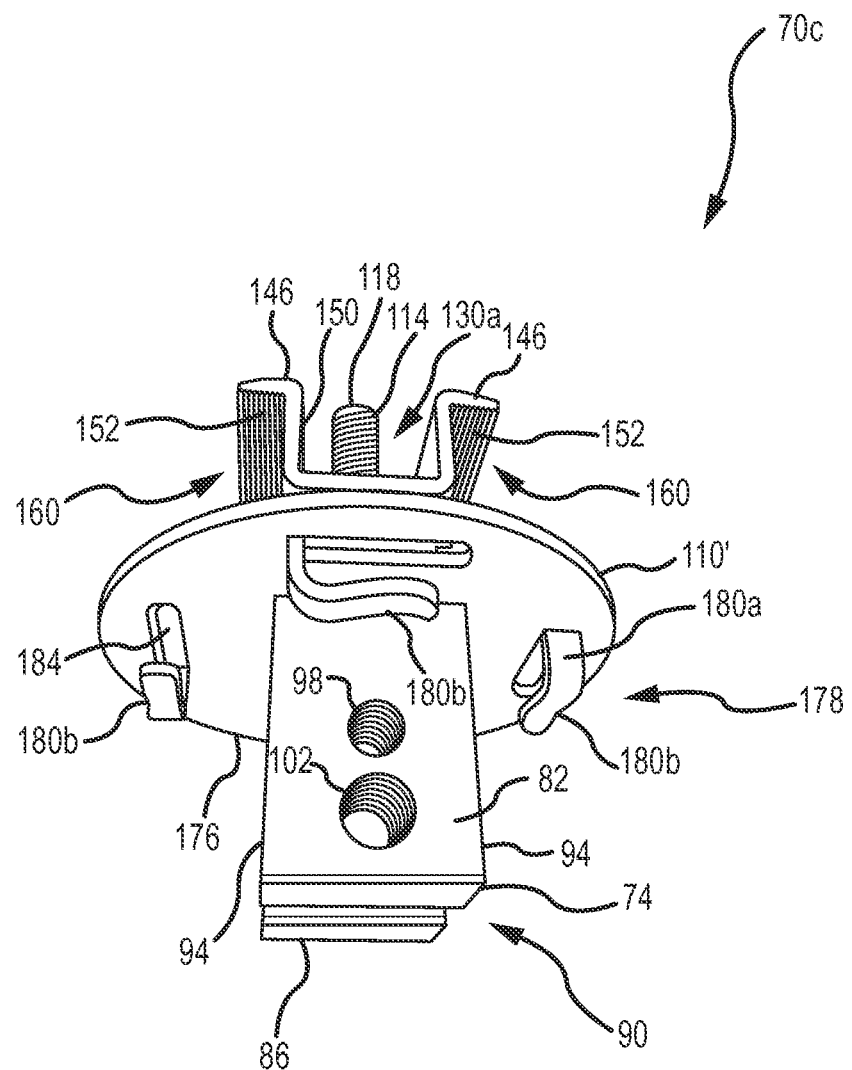
FIG. 8D is a bottom-based perspective view of the mounting assembly of FIG. 8A.
Figure 8E:
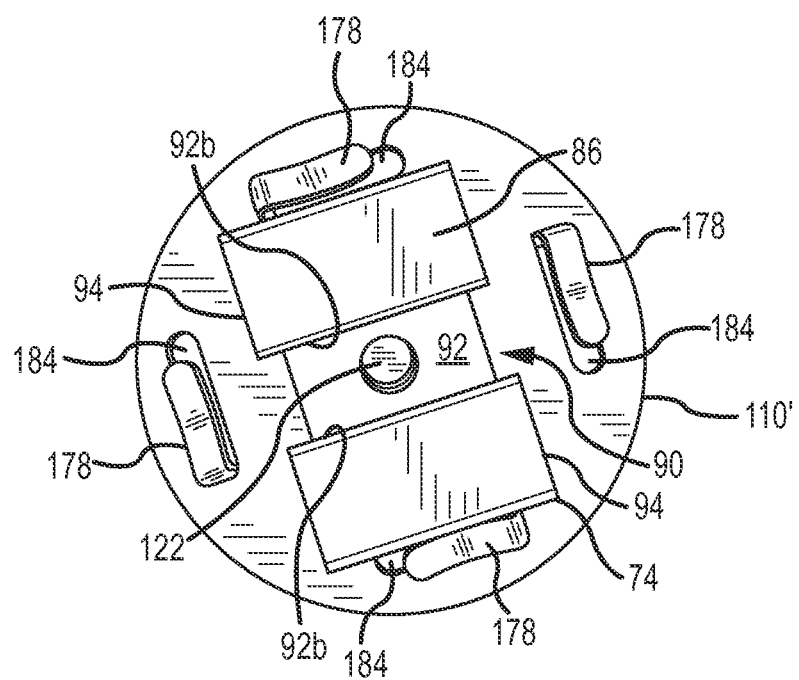
FIG. 8E is a plan view of a bottom of the mounting assembly of FIG. 8A.
Figure 8F:
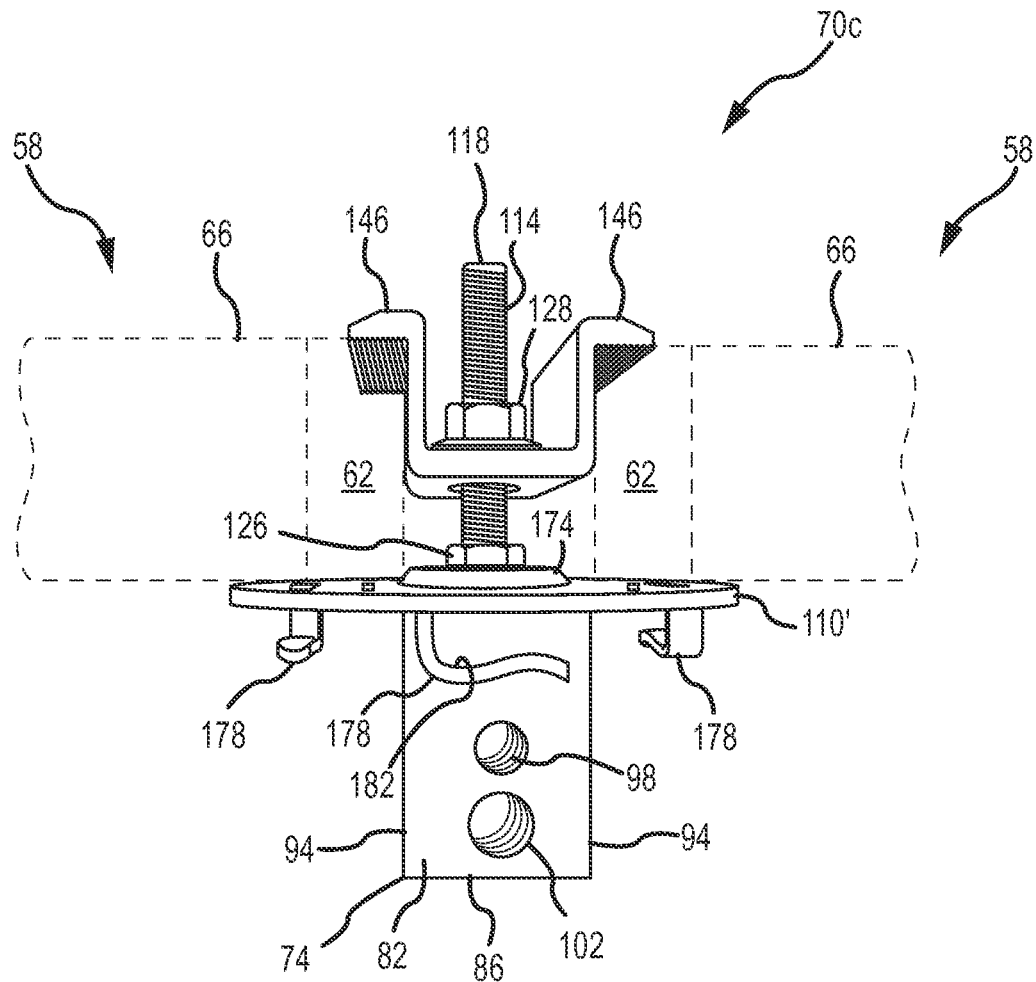
FIG. 8F is another side-based perspective view of the mounting assembly of FIG. 8A, and schematically illustrating the engagement of a pair of photovoltaic modules.

FIG. 8F schematically illustrates the positional registration/alignment function provided by the raised structure 174 of the mounting plate 110'. Here the frame 62 of one photovoltaic module 58 being clamped by the mounting assembly 70c abuts one portion on a perimeter of the raised structure 174, while the frame 62 of another photovoltaic module 58 being clamped by the mounting assembly 70c is disposed adjacent to (or possibly abutting with) an oppositely disposed portion on the perimeter of the raised structure 174. In one embodiment, the width or outer diameter of the raised structure 174 is the same as or slightly larger than the spacing between the two extensions 150 of the clamping member 142.

In any case, the raised structure 174 should be sized such that when an adjacent pair of photovoltaic modules 58 are positioned to abut oppositely disposed portions on the perimeter of the raised structure 174, the clamping member 142 should be positionable on the stud 114 and should properly engage these photovoltaic modules.

At least one grounding projection 172 of the mounting plate 110' shown in FIG. 8F should be engaged with the frame 62 of one photovoltaic module 58 shown in FIG. 8F, and at least one other grounding projection 172 of this same mounting plate 110' should be engaged with the frame 62 of the other photovoltaic module 58 shown in FIG. 8F. This again provides electrical continuity between the two modules 58 shown in FIG. 8F—an electrical path exists from one module 58 to the other module 58 via the mounting plate 110' and each grounding projection 172 that is engaged with either of the modules 58.

Figure 9A:
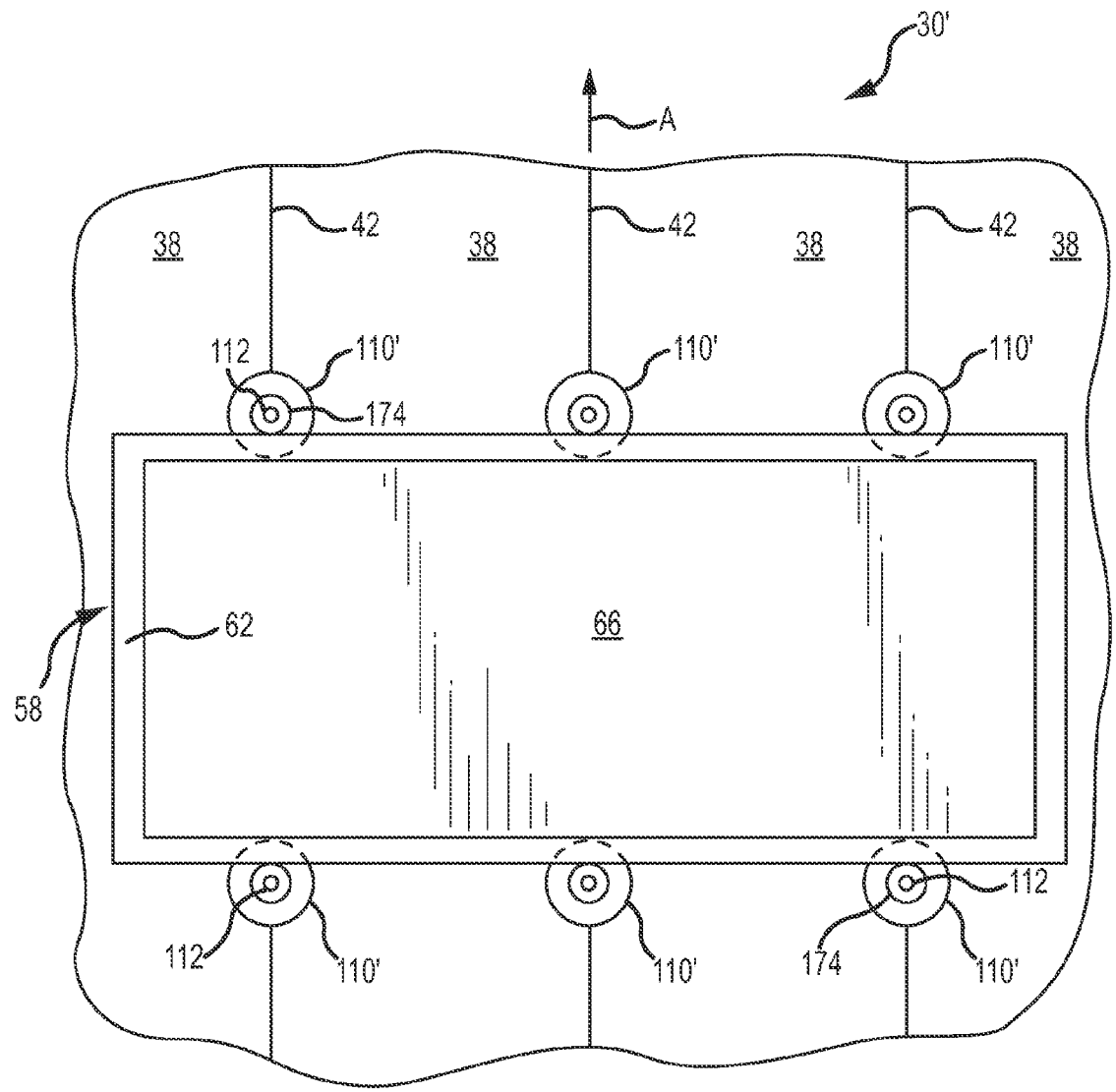
FIG. 9A is a plan view of one embodiment of a photovoltaic system using a plurality of the mounting assemblies of FIGS. 8A-F, and with the clamping members being removed to illustrate a positional registration function incorporated by the mounting plate of such mounting assemblies.

FIG. 9A illustrates the positional registration or alignment function provided by the mounting plate 110' incorporating a raised structure 174 (which thereby may be referred to as a PV module positional registrant). In FIG. 9A, the mounting devices 74 are attached to the standing seams 42 such that the frame 62 of the photovoltaic module 58 engages a portion on the outer perimeter of the raised structure 174. The clamping member 142 for each such mounting device 74 should not only be in proper position to adequately engage the frame 62 of the photovoltaic module 58 shown in FIG. 9A, but the clamping member 142 for each such mounting device 74 should also be in proper position to adequately engage the frame 62 of another photovoltaic module 58 that would be positioned in the uphill direction A (e.g., the arrow A indicating the direction of increasing elevation) from the illustrated photovoltaic module 58. The frame 62 of this "uphill" photovoltaic module 58 would likely engage an opposing portion of the raised structure 174 (or be disposed in closely spaced relation thereto). Any "downward drifting" of this uphill photovoltaic module 58 should be stopped by engaging the raised structure 174 of the "downhill" mounting assemblies 70c.

Figure 9B:
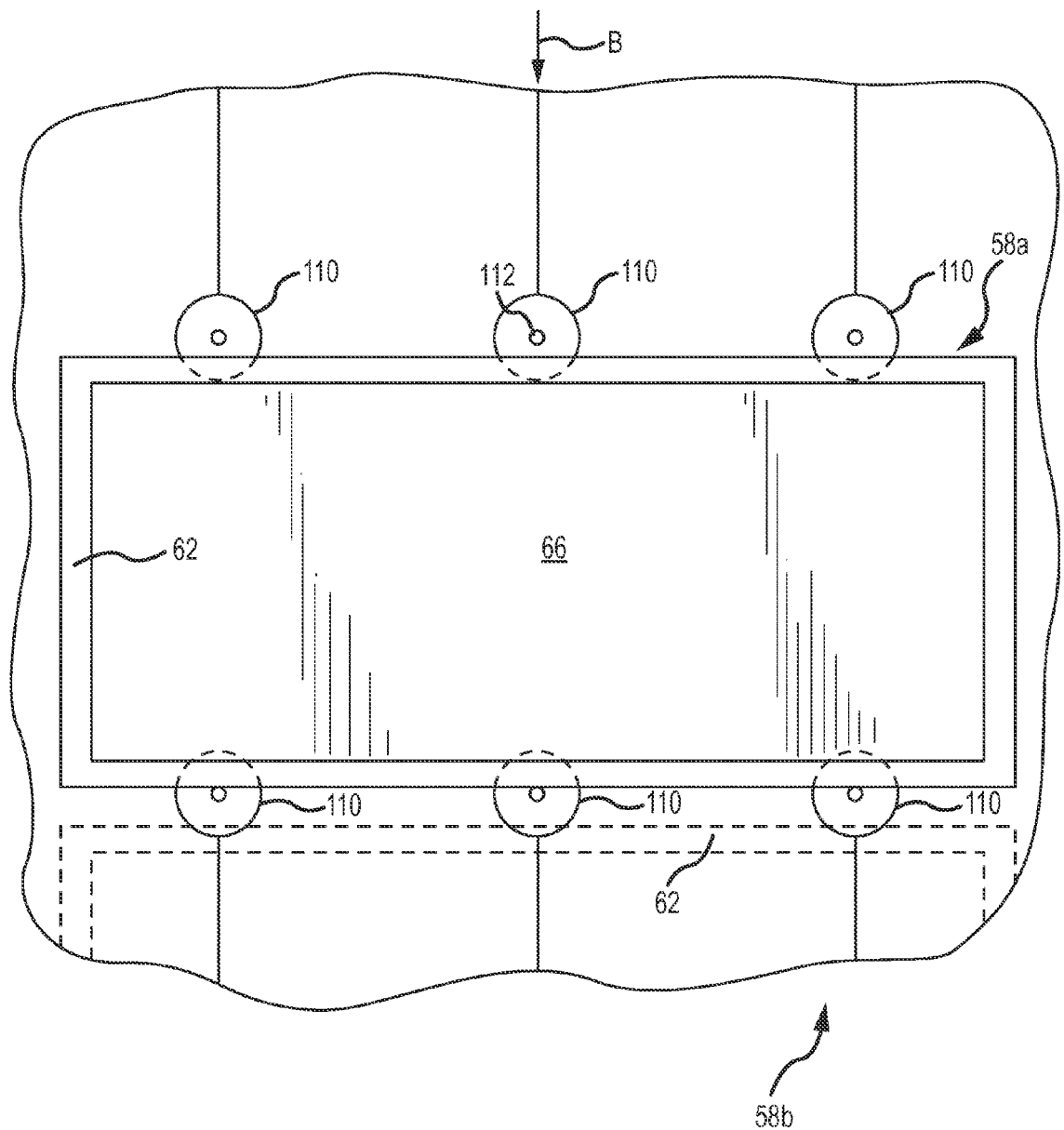
FIG. 9B is a plan view of a photovoltaic system using a plurality of the mounting assemblies of FIG. 6, and with the clamping members being removed therefrom to illustrate how a misaligned mounting assembly can affect the ability of the same to clamp onto one or more photovoltaic modules.

Now compare FIG. 9A to FIG. 9B. In FIG. 9B, the mounting assembly 70a has been used, and whose mounting plate 110 does not incorporate the raised structure 174 from the mounting plate 110' of FIGS. 8A-F. Here it can be seen that the uphill photovoltaic module 58a (the arrow B in FIG. 9B indicating the downhill direction, or direction of decreasing elevation) has been positioned relative to the three lower mounting devices 74 such that its frame 62 is quite close to the hole 112 of the three lower mounting plates 110 (through which the stud 114 is directed to threadably engage the mounting device 74). The three clamping members 142 associated with these three "downhill" mounting plates 110 now may not sufficiently engage the downhill photovoltaic module 58b.

Figure 10A:
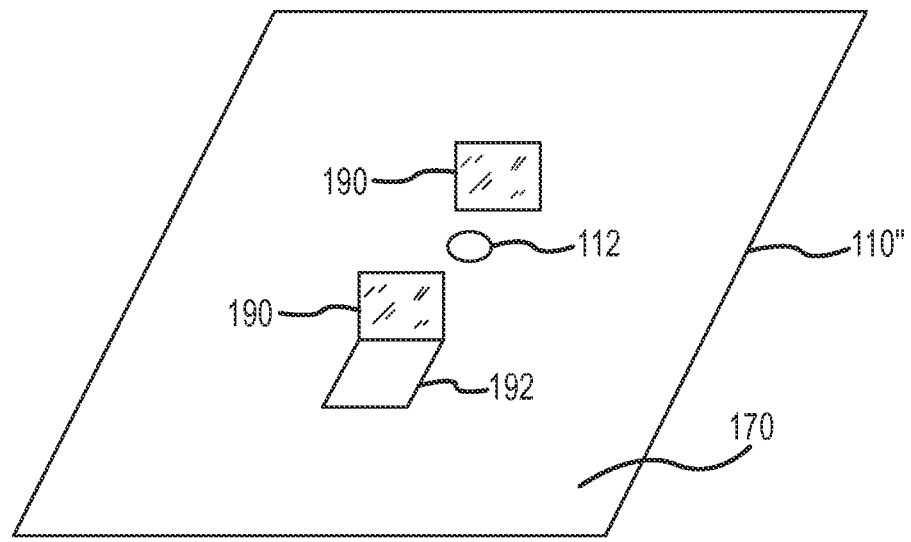
FIG. 10A is a perspective view of another embodiment of a mounting plate that incorporates a discrete pair of PV module positional registrants.
Figure 10B:
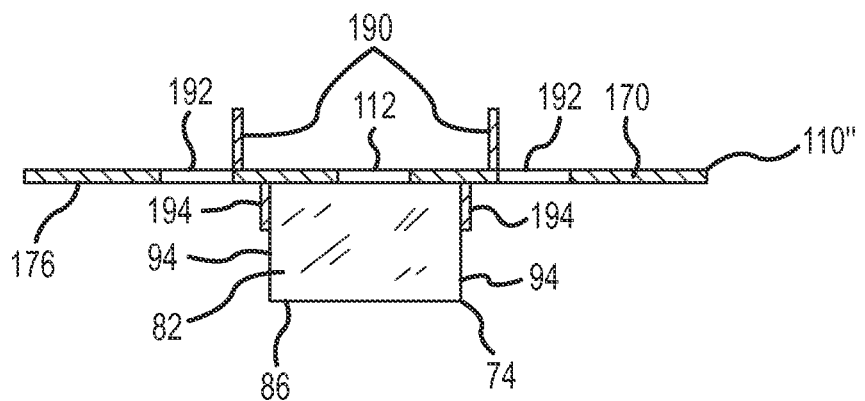
FIG. 10B is a side view of the mounting plate of FIG. 10 disposed on a mounting device, where the mounting plate includes a pair of mounting device positional registrants.

The mounting plate 110' from the mounting assembly 70c of FIGS. 8A-F uses a single raised structure 174 to provide a positional registration or alignment function for each of the two photovoltaic modules that may be clamped by a single mounting assembly 70c. Other types of positional registration or alignment features may be incorporated by a mounting plate. One representative embodiment is illustrated in FIGS. 10A-B in the form of a mounting plate 110". Generally, the mounting plate 110" may be used in place of the mounting plate 110' discussed above. Although not shown, it should be appreciated that the mounting plate 110" may also utilize the grounding projections 172 and/or wiring clips 178 (and their associated apertures 184).

The mounting plate 110" of FIGS. 10A and 10B differs from the mounting plate 110' of FIGS. 8A-F in a number of respects. One is the shape of the mounting plate 110'. Each of these mounting plates 110', 110" may be of any appropriate shape in relation to their respective outer perimeters (e.g., circular as in the case of the mounting plate 110'; square as in the case of the mounting plate 110"; rectangular). Another is that the mounting plate 110" utilizes at least two discrete PV module positional registrants 190. Each of the PV module positional registrants 190 may be of any appropriate size, shape, and/or configuration. The PV module positional registrants 190 may be integrally formed with a remainder of the mounting plate 110" as shown where they have been stamped from the mounting plate 110" (creating corresponding apertures 192), or the PV module registrants 190 could be separately attached to the mounting plate 110". When the mounting plate 110" is positioned in the proper orientation on a mounting device 74, one of the PV module positional registrants 190 may be used to position one photovoltaic module on the mounting plate 110" (e.g., by this first photovoltaic module butting up against this first PV module positional registrant 190) such that it should be adequately engaged by the clamping member 142, and furthermore such that the other or second photovoltaic module to be positioned on the mounting plate 110" should also be adequately engaged by this same clamping member 142. In this regard, this second photovoltaic module may be positioned such that it butts up against the other or second of the PV module positional registrants 190 of the mounting plate 110".

As there are only two PV module positional registrants 190 in the illustrated embodiment of FIGS. 10A and 10B, the mounting plate 110" may need to be in a certain angular position or orientation on the mounting device 74 such that they provide a positional registration or alignment function for the two photovoltaic modules to be clamped by the associated mounting assembly. An installer could be required to place the mounting plate 110" onto the mounting device 74 in the correct angular position or orientation. Another option is for the mounting plate 110" to include one or more mounting device positional registrants 194 that facilitate the positioning of the mounting plate 110" onto the upper surface 78 of the mounting device 74 such that the PV module positional registrants 190 should be positioned to provide a positional registration or alignment function for the two photovoltaic modules to be clamped by the associated mounting assembly. In the illustrated embodiment, the mounting plate 110" includes a pair of mounting device positional registrants 194—a separate mounting device positional registrant 194 for each of the two opposite ends 94 of the mounting device 74 (e.g., one mounting device positional registrant 194 may engage one end 94 of the mounting device 74, and another mounting device positional registrant 194 may engage the opposite end 94 of the mounting device 74). A pair of mounting device positional registrants could be utilized by the mounting plate 110" and that engage the two opposite side surfaces 82 of the mounting device 74 to place the mounting plate 110" in the correct angular position relative to the mounting device 74. Yet another option would be to have at least one mounting device positional registrant for the mounting plate 110" that engages an end 94 of the mounting device 74 and at least one mounting device positional registrant for the mounting plate 110" that engages one of the side surfaces 82 of the mounting device 74. Any appropriate way of positionally registering the mounting plate 110" relative to the mounting device 74 may be utilized.

Figure 11:
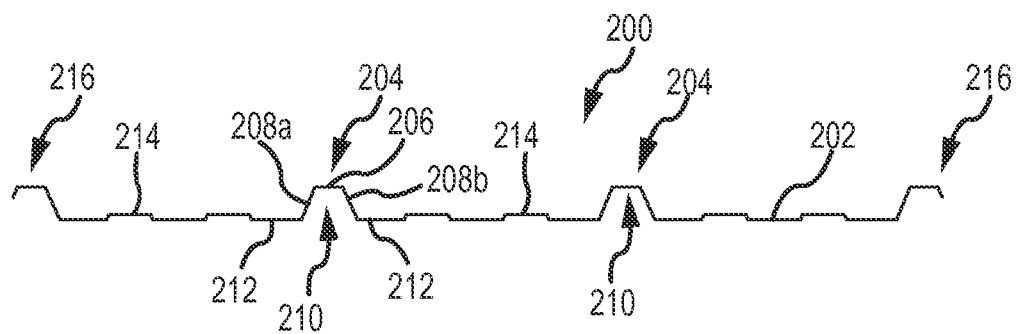
FIG. 11 is an end view of a representative trapezoidal rib panel.

Standing seam panels 38 were addressed above. Other types of panels are commercially available. Another example of a panel configuration is commonly referred to as a trapezoidal rib panel (e.g., formed from an appropriate metal alloy). A representative trapezoidal rib panel is illustrated in FIG. 11 and is identified by reference numeral 202. A plurality of these panels 202 may be assembled to define a building surface or a trapezoidal rib panel surface 200 (e.g., a roof or roofing surface). A given trapezoidal rib panel 202 may include one or more trapezoidal ribs 204 with a base section 212 positioned on each side thereof, and furthermore may include one or more minor ribs 214. A given trapezoidal rib panel 202 may in fact not use any minor ribs 214. In any case, an edge portion 216 of one trapezoidal rib panel 202 may be nested with an edge portion 216 of an adjacent trapezoidal rib panel 202 to collectively define a trapezoidal rib 204 as well.

Each trapezoidal rib 204 may include an upper rib wall 206 in the form of a flat or planar surface. Each trapezoidal rib 204 may also include a pair of sides 208a, 208b. The sides 208a, 208b are spaced from each other and are disposed in non-parallel relation. Typically the sides 208a, 208b of a trapezoidal rib 204 will be the mirror image of each other in relation to their respective orientations. In any case, the upper rib wall 206 and the two sides 208a, 208b collectively define a hollow interior or open space 210 for the trapezoidal rib 204.

One embodiment of a mounting device that is adapted for use with trapezoidal rib panels is illustrated in FIGS. 12A-D, and may be used to install various types of attachments on such trapezoidal rib panels. The mounting device shown in FIGS. 12A-D is in the form of a mounting bracket 220 that is of one-piece construction (e.g., no joint of any kind between any adjacent portions of the mounting bracket 220; the mounting bracket 220 is not an assembly of two or more separately-formed and separately-joined portions). In one embodiment, the mounting bracket 220 is in the form of extrusion to provide such a one-piece construction. The mounting bracket 220 may be formed from any appropriate material or combination of materials (e.g., an aluminum alloy; other metal alloys).

The mounting bracket 220 includes an upper wall or mounting surface 224 and a pair of side legs 228a, 228b that extend downwardly from the upper wall 224 when the mounting bracket 220 is installed on a trapezoidal rib 204. The upper wall 224 is the uppermost portion of the mounting bracket 220 when positioned on a trapezoidal rib 204, extends between a pair of open ends 222 of the mounting bracket 220, and is in the form of a single flat surface (rectangular in the illustrated embodiment). In one embodiment, the upper wall 224 provides a flat surface area, that is defined by a perimeter which in turn defines an area of at least 2.5 inches$^2$, to provide an appropriate surface for supporting attachments of any appropriate type (discussed below). In this regard, the upper wall 224 includes a mounting hole 226 that extends completely through this upper wall 224. Although a single mounting hole 226 is shown, multiple mounting holes could be incorporated by the upper wall 224 if required by a particular application or if otherwise desired.

A single mounting hole 226 is shown in the illustrated embodiment (e.g., located equidistantly from the two ends 222, although such may not be required in all instances). Multiple mounting holes could be incorporated by the upper wall 224 if required by a particular application or if otherwise desired. Each given mounting hole 226 may be threaded or unthreaded. In the case of a threaded mounting hole 226, a threaded attachment fastener (e.g., a threaded stud or bolt) could have its threads engaged with the threads of a particular mounting hole 226 to secure at least one attachment relative to the mounting bracket 220. An attachment fastener could also extend through a particular mounting hole 226 without having any type of threaded engagement with the mounting bracket 220, and a nut could be threaded onto an end of this attachment fastener (this end being disposed within an open space 250a of the mounting bracket 220, discussed below) to secure at least one attachment relative to the mounting bracket 220.

Any appropriate configuration may be utilized by each mounting hole 226 through the upper wall 224 of the mounting bracket 220. Representative configurations for each mounting hole 226 include circular or round. A given mounting hole could also be in the form of an elongated slot 226', as shown by dashed lines in FIG. 12C.

Figure 12A:
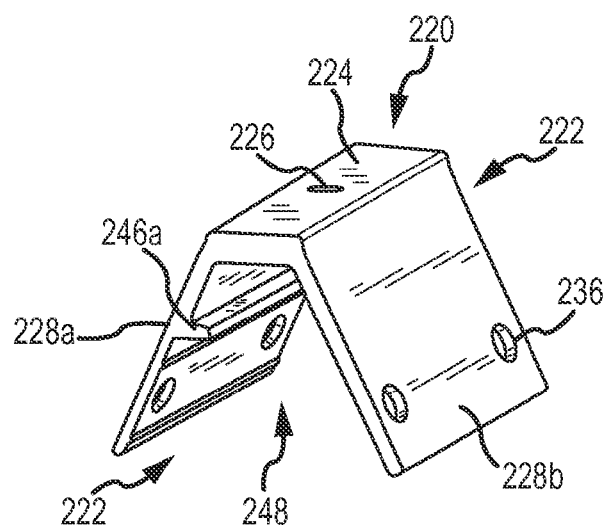
FIG. 12A is a perspective view of one embodiment of a mounting bracket for use with trapezoidal rib panels.
Figure 12B:
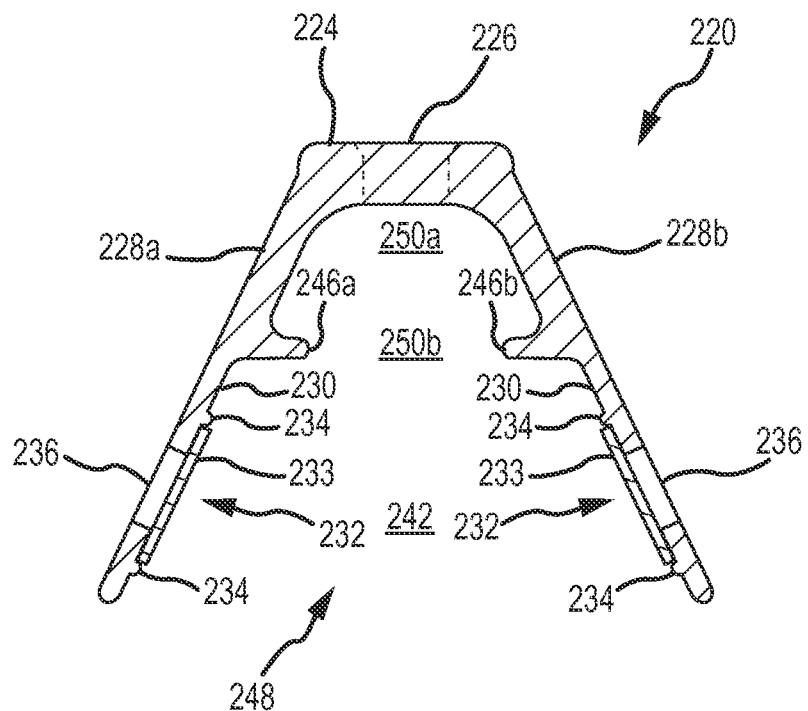
FIG. 12B is cross-sectional view of the mounting bracket of FIG. 12A.
Figure 12C:
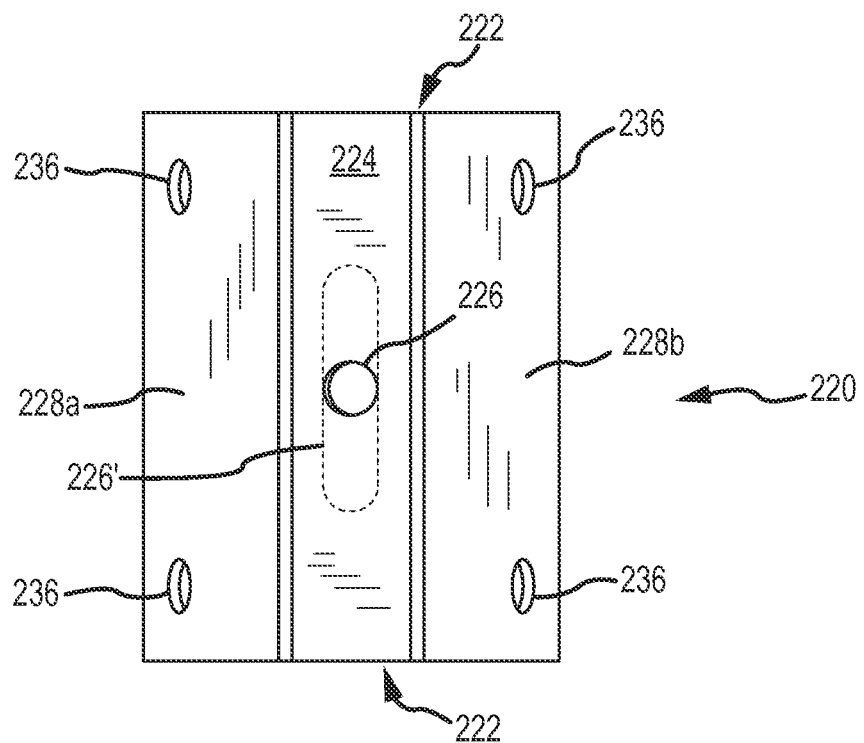
FIG. 12C is a top view of the mounting bracket of FIG. 12A.
Figure 12D:
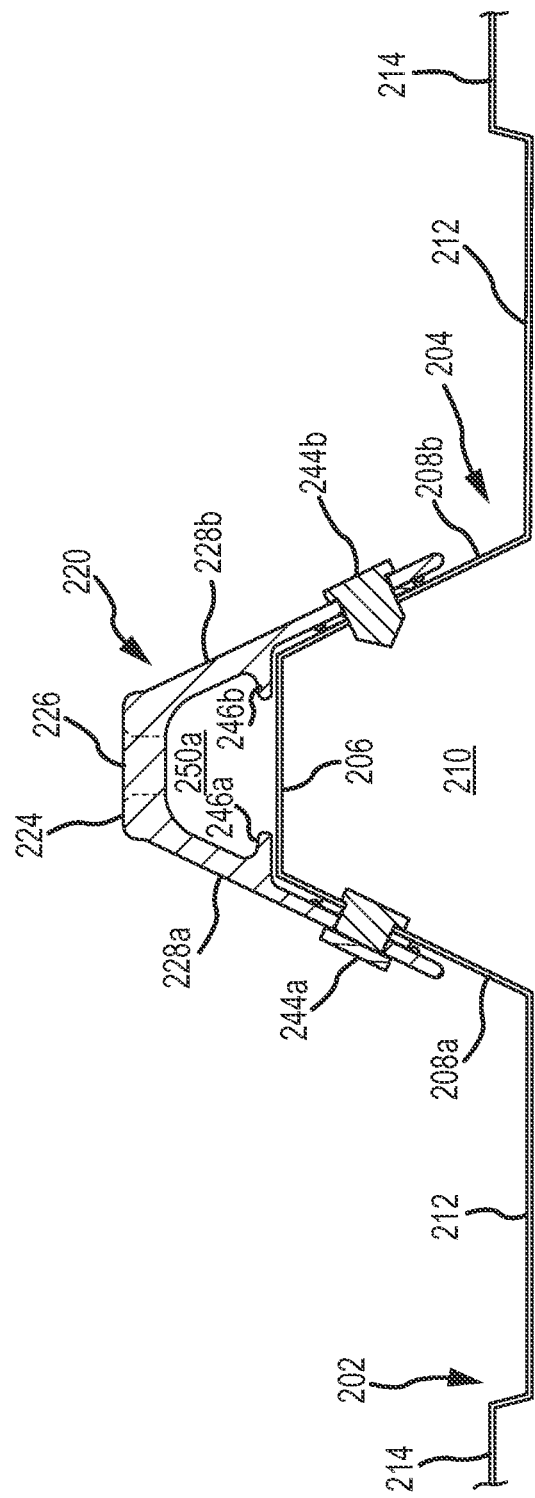
FIG. 12D is a cross-sectional view of the mounting bracket of FIG. 12A when installed on a trapezoidal rib of a trapezoidal rib panel.

The bracket side legs 228a, 228b are spaced from one another, and will typically be the mirror image of each other with regard to their respective orientations (e.g., an included angle between the underside of the upper wall 224 and the inside surface 230 each of the side legs 228, 228b being greater than 90° as shown). The bracket side leg 228a is positioned along an upper portion of the side 208a of a trapezoidal rib 204 (FIG. 12D), while the opposite bracket side leg 228b is positioned along an upper portion of the opposite side 208b of this same trapezoidal rib 204 (FIG. 12D). The bracket side legs 228a, 228b may be disposed in overlying relation with respect to any relevant portion of the corresponding side 208a, 208b of the trapezoidal rib 204. It should be appreciated that the bracket side legs 228a, 228b will typically be disposed in at least generally parallel relation to their corresponding side 208a, 208 of the trapezoidal rib 204.

At least part of the bracket side leg 228a may engage the side 208a of the trapezoidal rib 204, while at least part of the bracket side leg 228b may engage the side 208b of the trapezoidal rib 204. In the illustrated embodiment, each of the bracket side legs 228a, 228b includes an inner surface 230 that faces or projects toward the corresponding side 208a, 208b of the trapezoidal rib 204. In the illustrated embodiment, there may be two discrete zones of contact between each bracket side leg 228a, 228b and its corresponding side 208a, 208b of the trapezoidal rib 204. In this regard, each inner surface 230 includes a pair of rails, projections, or dimples 234 that may extend between the two open ends 222 of the mounting bracket 220. If the spacing between the two open ends 222 is characterized as the length dimension for the mounting bracket 220, each projection 234 may be extend along at least part of the length of the mounting bracket 220.

Each projection 234 may provide a discrete zone of contact (e.g., extending along a line or axial path) between the corresponding bracket side leg 228a, 228b and its corresponding side 208a, 208b of the trapezoidal rib 204. Generally, the use of the projections 234 reduces the area of contact between the mounting bracket 220 and the trapezoidal rib 204, which should reduce the potential for capillary entrapment (e.g., should reduce the potential of water "wicking" into interfacing surfaces of the mounting bracket 220 and trapezoidal rib 204, which could lead to the development of corrosion and premature failure of the building surface 200).

A gasket pocket or receptacle 232 is defined between the projections 234 on the inner surface 230 of each of the bracket side legs 228a, 228b. At least one fastener hole 236 extends through each of the bracket side legs 228a, 228b and intersects the corresponding gasket pocket 232. In the illustrated embodiment, there are two fastener holes 236 that are aligned with the gasket pocket 232 for each of the bracket side legs 228a, 228b. A gasket 233 of any appropriate type (e.g., an EPDM gasket) is disposed within each of the gasket pockets 232. The projections 234 on the inner surface 230 of the bracket side leg 228a confine the corresponding gasket 233 therebetween. Similarly, the projections 234 on the inner surface 230 of the bracket side leg 228b confine the corresponding gasket 233 therebetween.

In one embodiment, each gasket 233 is thicker than the depth of its corresponding gasket pocket 232 prior to the mounting bracket 220 being secured to the trapezoidal rib 204. As such, the gaskets 233 may be compressed between the mounting bracket 220 and the trapezoidal rib 204 as the mounting bracket 220 is secured to the trapezoidal rib 204. The above-described projections 234 may also provide the function of reducing the potential of these gaskets 233 being "over compressed" while securing the mounting bracket 220 to a trapezoidal rib 204.

Each gasket 233 may be installed within its corresponding gasket pocket 232 prior to installing the mounting bracket 220 on a trapezoidal rib 204. Any appropriate way of maintaining a gasket 233 within its corresponding gasket pocket 232 may be utilized (e.g., by being press fit within the corresponding gasket pocket 232; adhering a gasket 233 to the inner surface 230 of its corresponding gasket pocket 232). When the mounting bracket 220 is secured to the trapezoidal rib 204, the gasket 233 may compress to bring the above-noted projections 234 into contact with the corresponding side 208a, 208b of the trapezoidal rib 204. However, the projections 234 should still at least substantially confine the corresponding gasket 233 within its corresponding gasket pocket 232, and furthermore should reduce the potential for the gaskets 233 being over-compressed during installation as noted.

The mounting bracket 220 further includes a pair of rib offsetting members 246a, 246b that are disposed within a hollow interior 248 of the mounting bracket 220 (e.g., the partially enclosed space collectively defined by the upper wall 224 and the pair of bracket side legs 228a, 228b). Each rib offsetting member 246a, 246b is disposed in spaced relation to the upper wall 224 of the mounting bracket 220. One rib offsetting member 246a extends from the bracket side leg 228a toward, but not to, the opposite bracket side leg 228b. The other rib offsetting member 246b extends from the bracket side leg 228b toward, but not to, the opposite bracket side leg 228a.

The underside of each rib offsetting member 246a, 246b is positioned on the upper rib wall 206 of the trapezoidal rib 204 to dispose the upper wall 224 of the mounting bracket 220 above and in spaced relation to the upper rib wall 206 of the trapezoidal rib 204 (FIG. 12D). The hollow interior 248 of the mounting bracket 220 may be characterized as including a first open space 250a that is positioned above the rib offsetting members 246a, 246b (and below the upper wall 224 of the bracket 220), a second open space 250b between the opposing free ends of the rib offsetting members 246a, 246b, and a third open space or rib receptacle 242 that is positioned below the rib offsetting members 246a, 246b. That is, the two rib offsetting members 246a, 246b, and each of the bracket side legs 228a, 228b may be characterized as collectively defining the rib receptacle 242 (e.g., by defining the portion of the hollow interior 248 of the mounting bracket 220 in which a trapezoidal rib 204 may be disposed). At least an upper portion of a trapezoidal rib 204 may be disposed within the rib receptacle 242 of the mounting bracket 220 when the mounting bracket 220 is installed on such a trapezoidal rib 204 (e.g., FIG. 12D).

At least one fastener extends through the bracket side leg 228a (two being accommodated in the illustrated embodiment), through the gasket 233 in its corresponding gasket pocket 232, and terminates within the hollow interior 210 of the trapezoidal rib 204 when securing the mounting bracket 220 to a trapezoidal rib 204 (e.g., FIG. 12D). In the embodiment shown in FIG. 12D, the illustrated fastener for the bracket side leg 228a is in the form of a rivet 244a. At least one fastener also extends through the bracket side leg 228b (two being accommodated in the illustrated embodiment), through the gasket 233 in its corresponding gasket pocket 232, and also terminates within the hollow interior 210 of the trapezoidal rib 204 when securing the mounting bracket 220 to a trapezoidal rib 204 (e.g., FIG. 12D). In the embodiment shown in FIG. 12D, the illustrated fastener for the bracket side leg 228b is in the form of a sheet metal screw 244b. Any appropriate type/number of fasteners may be used to separately secure each bracket side leg 228a, 228b to the trapezoidal rib 204. As the upper wall 224 of the mounting bracket 220 is used as a supporting surface, no fasteners extend through the upper wall 224 of the mounting bracket 220 and through any portion of the trapezoidal rib 204. Moreover, all fasteners that are used to secure the mounting bracket 220 to the trapezoidal rib 204 terminate within the hollow interior 210 of the trapezoidal rib 204 (e.g., no fastener extends through the mounting bracket 220, through the trapezoidal rib panel 202, and into any underlying deck or supporting structure).

Figure 13:
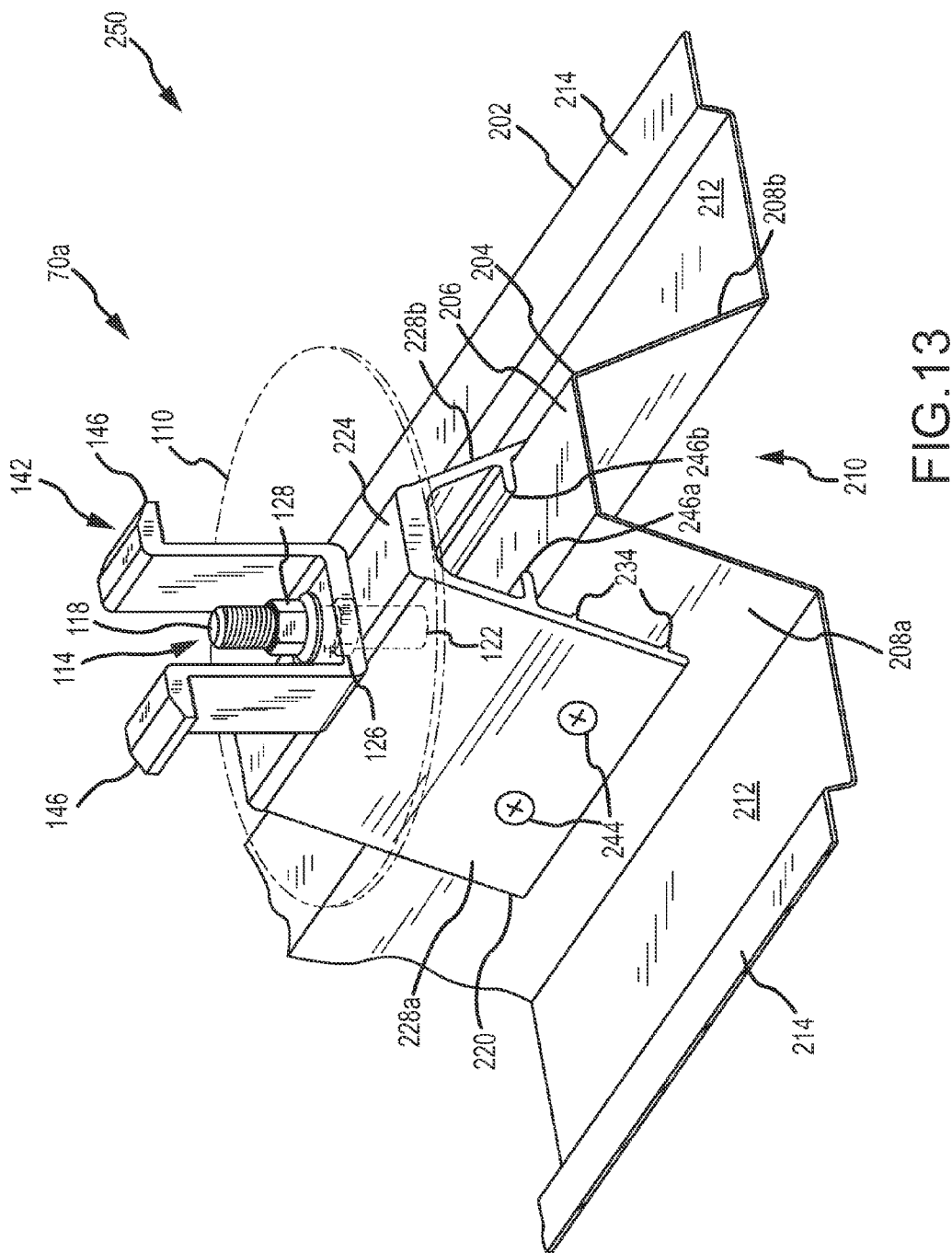
FIG. 13 is a perspective view of the mounting bracket of FIGS. 12A-D mounted on a trapezoidal rib of a trapezoidal rib panel, and with the mounting assembly 70a from FIGS. 7A-B being mounted on this mounting bracket.

Various types of attachments may be installed on a building surface defined by trapezoidal rib panels 202 using the above-described mounting bracket 220. One example is shown in FIG. 13, where a pair of fasteners 244 have been used to secure the bracket side leg 228a to the side 208a of the trapezoidal rib 204 in the above-noted manner, and where the bracket side leg 228b would be similarly secured to the side 208b of the trapezoidal rib 204. Here, the mounting assembly 70a (discussed above, and illustrated in FIG. 7A—the associated photovoltaic modules 58 not being shown in FIG. 13 for clarity) is installed on the mounting bracket 220 (i.e., the mounting bracket 220 may be used in place of the mounting device 74 for trapezoidal rib panel configurations and for the above-noted photovoltaic module applications, and in conjunction with each of the above-discussed mounting assemblies (e.g., mounting 70a-c)). The threaded stud 114 of the mounting assembly 70a is engaged with the mounting hole 226 (threaded in this example) on the upper wall 224 of the mounting bracket 220. The second stud end 122 is disposed within the hollow interior 248 of the mounting bracket 220 (e.g., the first open space 250a, and so as to not contact any structure of the mounting bracket 220). The mounting assemblies 70b, 70c discussed above may be similarly mounted to the mounting bracket 220 and at least generally in the above-discussed manner. It should be appreciated that the clamping member 142 may be rotated 90° from the position illustrated in FIG. 13 to accommodate installation of one or more photovoltaic modules 58 in the above-described manner.

The mounting assemblies 70a-c addressed above each may be characterized as an "attachment" when secured to the mounting bracket 220 in the above-noted manner (e.g., a mounting bracket 220 secured to a trapezoidal rib 202, and having an attachment that is secured relative to the mounting bracket 220, may be collectively characterized as an "attachment assembly 250", with such a representative attachment assembly 250 being shown in FIG. 13). Any photovoltaic module 58 that is engaged by any such mounting assembly 70a-c (when installed on a mounting bracket 220) may also be characterized as an attachment" that is secured relative to the mounting bracket 220 using an attachment fastener (e.g., threaded stud 114) that at least extends into a mounting hole 226 on the upper wall 224 of the mounting bracket 220, and collectively may be referred to as an "attachment assembly" as well.

Figure 14:
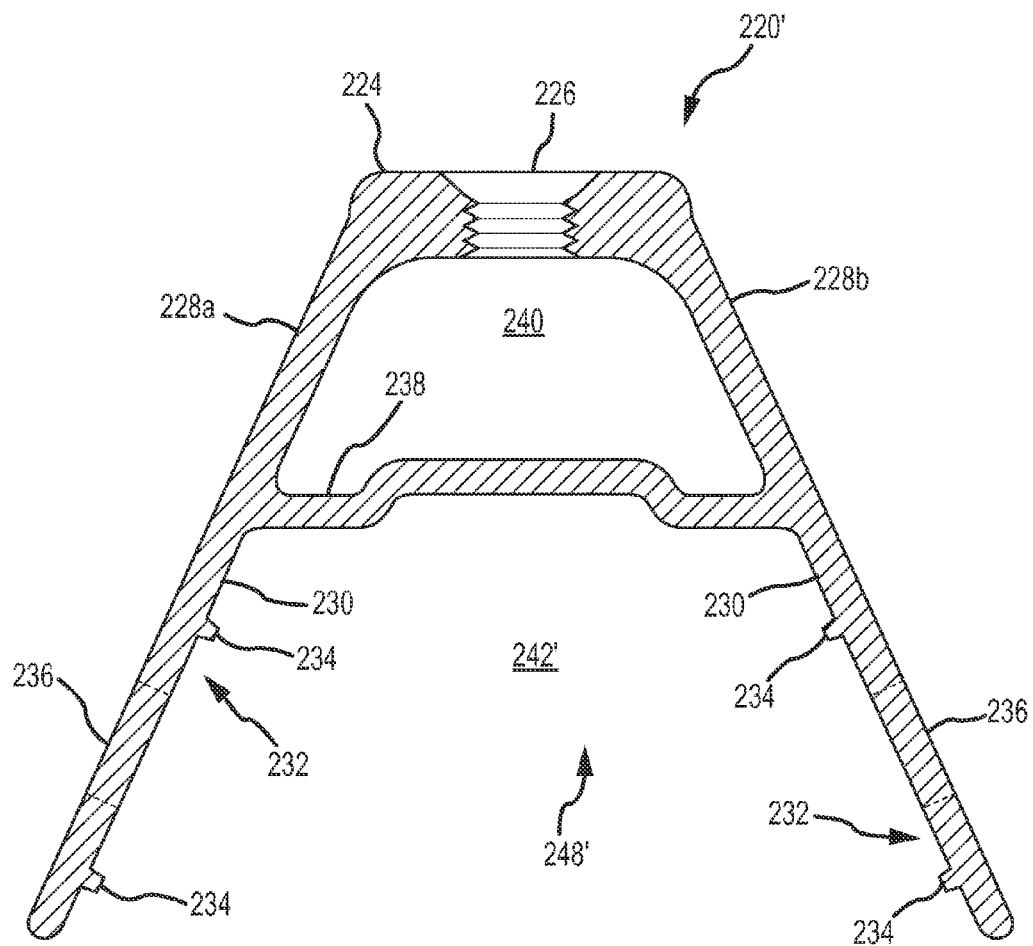
FIG. 14 is a cross-sectional view of a variation of the mounting bracket of FIG. 12A.

A variation of the mounting bracket 220 of FIGS. 12A-D is presented in FIG. 14. Corresponding components of these two embodiments are identified by the same reference numerals, and the discussion presented above remains applicable unless otherwise noted. Those corresponding components that differ in at least some respect are identified by a "single prime" designation. In the case of the mounting bracket 220' of FIG. 14, the two rib offsetting members 246a, 246b of the mounting bracket 220 of FIGS. 12A-D are replaced by a single rib offsetting member in the form of a cross member 238. This cross member 238 is disposed within the hollow interior 248' of the mounting bracket 220' (e.g., in the partially enclosed space collectively defined by the upper wall 224 and the pair of bracket legs 228a, 228b). This cross member 238 extends between the inner surfaces 230 of the two bracket side legs 228a, 228b. The cross member 238 is seated on the upper rib wall 206 of the trapezoidal rib 204 when the mounting bracket 220 is positioned on the trapezoidal rib 204. Although the entire underside of the cross member 238 could interface with the upper rib wall 206 of the rib 204, a central portion thereof may "bulge" away from the upper rib wall 206 of the rib 204 to address capillary entrapment.

The cross member 238 is disposed in spaced relation to the upper wall 224 of the mounting bracket 220'. An upper cavity or open space 240 (part of the hollow interior 248' of the mounting bracket 220') exists between the cross member 238 and the upper wall 224, and accommodates receipt of an attachment fastener that may extend through a mounting hole 226 to secure an attachment in position relative to the mounting bracket 220. In one embodiment, the upper wall 224 and the cross member 238 are separated by a distance of at least about ½ inch (e.g., the minimum vertical extent of the upper cavity 240 below the mounting hole 226 is about ½ inch ("vertical" being the dimension that is orthogonal to the upper wall 224)).

The cross member 238 and each of the bracket side legs 228a, 228b also collectively define a rib receptacle 242' (also part of the hollow interior 248' of the mounting bracket 220'). At least an upper portion of a trapezoidal rib 204 may be disposed within the rib receptacle 242' of the mounting bracket 220' when the mounting bracket 220' is installed on such a trapezoidal rib 204. The underside of at least part of the cross member 238 would be positioned on the upper rib wall 206 of the trapezoidal rib 204 to dispose the upper wall 224 of the mounting bracket 220' above and in spaced relation to the upper rib wall 206 of the trapezoidal rib 204. In the illustrated embodiment the portions of the cross member 238 that are adjacent to the bracket side legs 228a, 228b would be seated on the upper rib wall 206 of the trapezoidal rib 204, while the central portion of the cross member 238 would be spaced from the upper rib wall 206 of the trapezoidal rib 204, again to address capillary entrapment.

The mounting brackets 220, 220' provide a number of advantages for installing an attachment on a trapezoidal rib panel surface. Initially, photovoltaic modules may be installed on a trapezoidal rib panel surface with or without rails using the mounting brackets 220/220'. The mounting brackets 220/220' alleviate the need for any fastener to extend to any underlying deck or any other substrate (e.g., purlins) for the trapezoidal rib panel surface when securing the mounting brackets 220/220' to a trapezoidal rib on such a trapezoidal rib panel surface. This provides significant flexibility when installing PV modules on a trapezoidal rib panel surface.

Multiple mounting brackets 220/220' may be used to support a photovoltaic module above a trapezoidal rib panel surface without having these mounting brackets 220/220' directly anchored to an underlying substrate or support deck for the trapezoidal rib panel surface. A total of at least four of the mounting brackets 220/220' may be used to support a given photovoltaic module (two brackets 220/220' spaced along a first trapezoidal rib, and two brackets 220/220' spaced along a second trapezoidal rib that is appropriately spaced from the first trapezoidal rib). Where a photovoltaic module is characterized as having four edge portions (e.g., of a square or rectangular configuration), at least two mounting brackets 220/220' may support one edge portion of a given photovoltaic module, and at least two mounting brackets 220/220' may support an oppositely disposed edge portion of the same photovoltaic module. This allows the sheeting of the trapezoidal rib panel surface to itself support the photovoltaic modules (versus having to "anchor" supporting structures for the photovoltaic modules to the underlying deck or substrate for the trapezoidal rib panel surface).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. An assembly, comprising:
    a building surface defined by a plurality of assembled panels, wherein each panel of said plurality of panels comprises a trapezoidal rib with a hollow interior, wherein said plurality of panels comprises a first panel with a first trapezoidal rib, and wherein said first trapezoidal rib comprises a first hollow interior;
    a mounting bracket positioned on said first trapezoidal rib, wherein said mounting bracket is of a one-piece construction and comprises:
        an upper wall comprising a mounting hole;
        first and second side legs that each extend downwardly from said upper wall in non-parallel relation to one another, said first side leg being disposed adjacent to a first side of said first trapezoidal rib and said second side leg being disposed adjacent to a second side of said first trapezoidal rib;
        at least one hollow space between said first and second side legs, wherein at least part of said at least one hollow space is disposed directly beneath said upper wall;
        at least one rib offsetting member that is disposed within said at least one hollow space, that extends from at least one of said first and second side legs, that is spaced from said upper wall, and that engages an upper rib wall of said first trapezoidal rib to offset said upper wall of said mounting bracket from said upper rib wall of said first trapezoidal rib;
    a first fastener that extends through said first side leg of said mounting bracket, through said first side of said first trapezoidal rib, and terminates within said first hollow interior of said first trapezoidal rib; and
    a second fastener that extends through said second side leg of said mounting bracket, through said second side of said first trapezoidal rib, and terminates within said first hollow interior of said first trapezoidal rib.

2. The assembly of claim 1, wherein said mounting hole is a slot that is elongated in a length dimension of said mounting bracket.

3. The assembly of claim 1, wherein said mounting bracket comprises first and second open ends, wherein said upper wall extends between said first and second open ends, and wherein an entirety of said upper wall is in the form of a single flat surface that incorporates said mounting hole.

4. The assembly of claim 3, wherein said single flat surface of said upper wall has a perimeter that defines an area of at least 2.5 in.$^2$.

5. The assembly of claim 4, wherein said single flat surface is the only external surface of said mounting bracket that faces in a first direction.

6. The assembly of claim 1, wherein said upper wall defines an uppermost extreme of said mounting bracket when positioned on said first trapezoidal rib, wherein an entirety of said upper wall is in the form of a single flat surface that incorporates said mounting hole, and wherein said single flat surface has a perimeter that defines an area of at least 2.5 in.$^2$.

7. The assembly of claim 1, wherein said first and second side legs are the mirror image of one another.

8. The assembly of claim 1, wherein an inner surface of said first side leg comprises a first gasket pocket, and wherein an inner surface of said second side leg comprises a second gasket pocket.

9. The assembly of claim 8, further comprising:
a first gasket positioned within said first gasket pocket; and
a second gasket positioned within said second gasket pocket.

10. The assembly of claim 9, wherein said first gasket is confined within said first gasket pocket when said mounting bracket is installed on said first trapezoidal rib, and wherein said second gasket is confined within said second gasket pocket when said mounting bracket is installed on said first trapezoidal rib.

11. The assembly of claim 8, wherein said inner surface of each of said first and second side legs comprises first and second projections that are spaced from one another and that extend along an entire length of said mounting bracket, wherein said first and second projections on said inner surface of said first side leg define said first gasket pocket, and wherein said first and second projections on said inner surface of said second side leg define said second gasket pocket.

12. The assembly of claim 8, wherein said first side leg comprises at least one fastener hole that intersects with said first gasket pocket, and wherein said second side leg comprises at least one fastener hole that intersects with said second gasket pocket.

13. The assembly of claim 12, wherein said first side leg comprises first and second fastener holes that intersect with said first gasket pocket, and wherein said second side leg comprises third and fourth fastener holes that intersect with said second gasket pocket.

14. The assembly of claim 1, wherein said at least one rib offsetting member comprises first and second rib offsetting members, wherein said first rib offsetting member extends from said first side leg toward, but not to, said second side leg, and wherein said second rib offsetting member extends from said second side leg toward, but not to, said first side leg.

15. The assembly of claim 14, wherein said least one hollow space comprises a first open space extending between said upper wall and said first and second rib offsetting members, a second open space defined by a space between said first and second rib offsetting members, and a third open space below said first and second rib offsetting members.

16. The assembly of claim 1, further comprising:
an attachment; and
an attachment fastener that extends at least into said mounting hole on said upper wall of said mounting bracket, wherein said attachment is secured relative to said mounting bracket by said attachment fastener.

17. The assembly of claim 1, wherein an inner surface of each of said first and second side legs comprises first and second projections that are spaced from one another and that extend along at least a portion of a length of said mounting bracket, wherein said first and second projections on said inner surface of said first side leg engage said first side of said first trapezoidal rib and with said at least one rib offsetting member being located between said upper wall and said first and second projections on said inner surface of said first side leg in a vertical dimension, and wherein said first and second projections on said inner surface of said second side leg engage said second side of said first trapezoidal rib and with said at least one rib offsetting member being located between said upper wall and said first and second projections on said inner surface of said second side leg in said vertical dimension.

18. The assembly of claim 17, further comprising:
a first gasket pocket defined between said first and second projections on said inner surface of said first side leg; and
a second gasket pocket defined between said first and second projections on said inner surface of said second side leg.

19. The assembly of claim 18, wherein said first side leg comprises at least one fastener hole that intersects with said first gasket pocket, and wherein said second side leg comprises at least one fastener hole that intersects with said second gasket pocket.

20. The assembly of claim 18, further comprising:
a first gasket positioned within said first gasket pocket; and
a second gasket positioned within said second gasket pocket.

21. The assembly of claim 20, wherein said first side leg comprises at least one fastener hole that intersects with said first gasket pocket, and wherein said second side leg comprises at least one fastener hole that intersects with said second gasket pocket.

22. The assembly of claim 20, wherein said first gasket protrudes beyond said first and second projections on said inner surface of said first side leg prior to installing said mounting bracket on said first trapezoidal rib, and wherein said second gasket protrudes beyond said first and second projections on said inner surface of said second side leg prior to installing said mounting bracket on said first trapezoidal rib.

23. A trapezoidal rib mounting bracket for trapezoidal rib panels, wherein said mounting bracket comprises a one-piece body, and wherein said one-piece body comprises:
an upper wall comprising a mounting hole;
first and second side legs that each extend downwardly from said upper wall in non-parallel relation to one another when said mounting bracket is positioned on a trapezoidal rib, said first side leg being disposable adjacent to a first side of a trapezoidal rib and said second side leg being disposable adjacent to a second side of the trapezoidal rib when said mounting bracket is positioned on the trapezoidal rib, wherein an inner surface of each of said first and second side legs comprises first and second projections that are spaced from one another and that extend along at least a portion of a length of said mounting bracket;
at least one hollow space located between said first and second side legs;

a first rib offsetting member that extends from said inner surface of said first side leg toward, but not to, said second side leg; and a second rib offsetting member that extends from an inner surface of said second side leg toward, but not to, said first side leg, wherein said first and second rib offsetting members are disposed within said at least one hollow space, are spaced from said upper wall, and engage an upper rib wall of a trapezoidal rib when said mounting bracket is positioned on the trapezoidal rib to offset said upper wall of said bracket from the upper rib wall of the trapezoidal rib, wherein said least one hollow space comprises a first open space extending above said first and second rib offsetting members and to said upper wall, a second open space defined by a space between said first and second rib offsetting members, and a third open space below said first and second rib offsetting members, wherein said first open space has a vertical extent of at least ½ inch, wherein said first rib offsetting member is located between said upper wall and said first and second projections on said inner surface of said first side leg in a vertical dimension, wherein said second rib offsetting member is located between said upper wall and said first and second projections on said inner surface of said second side leg in said vertical dimension, wherein said first side leg comprises at least one fastener hole that extends through said first side leg between said first and second projections on said inner surface of said first side leg, and wherein said second side leg comprises at least one fastener hole that extends through said second side leg between said first and second projections on said inner surface of said second side leg.

24. The mounting bracket of claim 23, wherein said first and second projections on said inner surface of each of said first and second side legs extend along an entire length of said mounting bracket.

25. The mounting bracket of claim 23, further comprising:
a first gasket pocket defined between said first and second projections on said inner surface of said first side leg; and
a second gasket pocket defined between said first and second projections on said inner surface of said second side leg.

26. The mounting bracket of claim 25, further comprising:
a first gasket positioned within said first gasket pocket; and
a second gasket positioned within said second gasket pocket.

27. The mounting bracket of claim 26, wherein said first gasket protrudes beyond said first and second projections on said inner surface of said first side leg prior to installing said mounting bracket on a trapezoidal rib, and wherein said second gasket protrudes beyond said first and second projections on said inner surface of said second side leg prior to installing said mounting bracket on a trapezoidal rib.

28. The mounting bracket of claim 23, wherein said mounting hole is a slot that is elongated in a length dimension of said mounting bracket.

* * * * *